United States Patent [19]

Kuruma et al.

[11] Patent Number: 5,321,606
[45] Date of Patent: Jun. 14, 1994

[54] DATA TRANSFORMING METHOD USING EXTERNALLY PROVIDED TRANSFORMATION RULES

[75] Inventors: Hironobu Kuruma, Kawasaki; Koichi Yamano, Tama, both of Japan

[73] Assignee: Hitachi, Ltd., Tokyo, Japan

[21] Appl. No.: 195,142

[22] Filed: May 18, 1988

[30] Foreign Application Priority Data

May 19, 1987 [JP] Japan .................. 62-120201
Nov. 9, 1987 [JP] Japan .................. 62-282371

[51] Int. Cl.$^5$ ............................ G06F 15/38
[52] U.S. Cl. ................... 364/419.08; 395/12;
364/DIG. 2; 364/920.4; 364/972.1; 364/972.2; 364/972.3
[58] Field of Search ......... 364/200 MS Files, 900 MS Files, 364/419; 395/12

[56] References Cited

U.S. PATENT DOCUMENTS

| | | | |
|---|---|---|---|
| 4,374,408 | 2/1983 | Bowles et al. | 364/200 |
| 4,463,423 | 7/1984 | Potash et al. | 364/200 |
| 4,599,691 | 7/1986 | Sakaki et al. | 364/419 |
| 4,641,264 | 2/1987 | Nitta et al. | 364/900 |
| 4,734,848 | 3/1988 | Yamano et al. | 364/200 |
| 4,811,400 | 3/1989 | Fisher | 381/44 |
| 4,887,212 | 12/1989 | Zamora et al. | 364/419 |
| 5,083,268 | 1/1992 | Hemphill et al. | 395/12 |

*Primary Examiner*—Debra A. Chun
*Attorney, Agent, or Firm*—Antonelli, Terry, Stout & Kraus

[57] ABSTRACT

In transformation from a symbol string to a term, transformation rules received describe structures of input symbol strings in the form of a context-free grammar, and include structures of output terms as arguments of terminal symbols and non-terminal symbols. An inputted symbol string is analyzed by reduction processing based on the structures of input symbol strings described in the transformation rules, and an intermediate tree is formed. A term for output is produced in accordance with the structures of output terms shown in the arguments of the terminal symbols and the non-terminal symbols corresponding to the structure of the inputted symbol string. Transformation of structured data is performed in like manner using transformation rules which describe structures of input data in terms of relations between classes of partial structures, and includes structures of output data as arguments of class identifiers.

13 Claims, 22 Drawing Sheets

FIG. 2

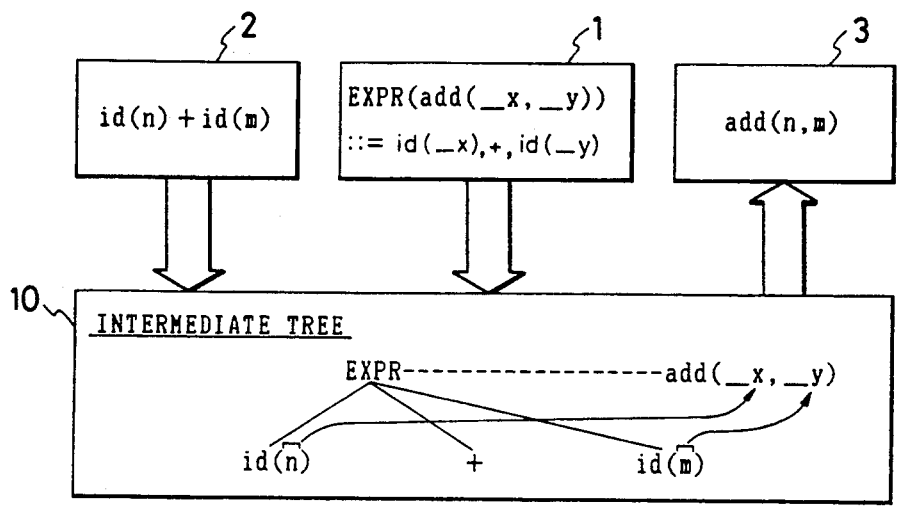

FIG. 3

TRANSFORM. RULE ELEMENT

41

| NONTERMINAL SYMBOL ON THE LEFT SIDE | INPUT PATTERN | OUTPUT TERM PATTERN | POINTER TO A NODE-SET CONSTRUCTOR |
|---|---|---|---|

NODE-SET CONSTRUCTOR

42

| POINTER TO A NODE CONNECTOR | POINTER TO A NODE-SET CONSTRUCTOR OF ANOTHER NODE SET |
|---|---|

NODE CONNECTOR

43

| POINTER TO A NODE | POINTER TO ANOTHER NODE-SET CONSTRUCTOR OF THE SAME NODE SET |
|---|---|

INTERMEDIATE TREE NODE

44

| INPUT SYMBOL POSITION | PATTERN MATCHING ENVIRONMENT | POINTER TO A NODE-SET CONSTRUCTOR |
|---|---|---|

INTERMEDIATE TREE LEAF

45

| INPUT SYMBOL POSITION | PATTERN MATCHING ENVIRONMENT |
|---|---|

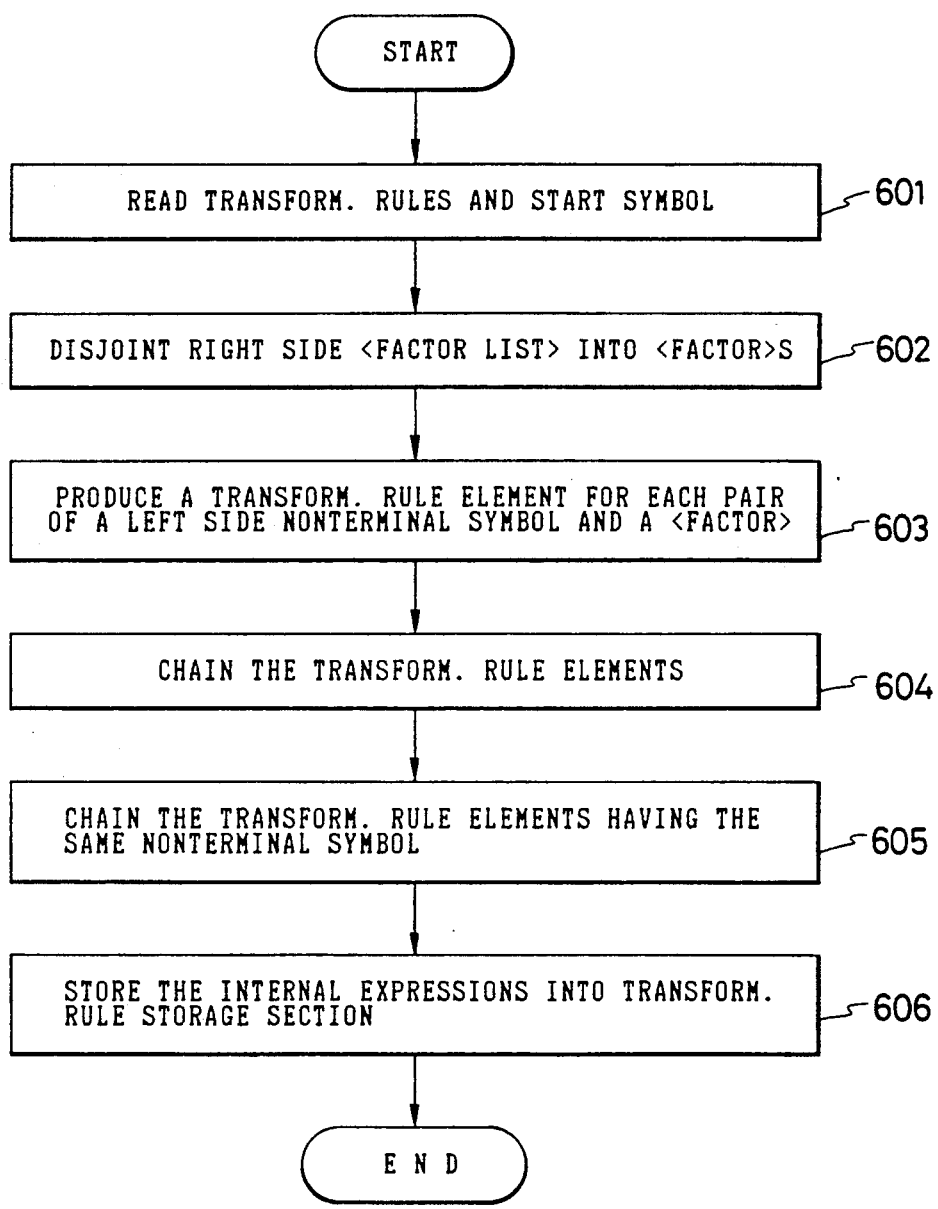

FIG. 10

TRANSFORM. RULE

| CLASS ID. ON THE LEFT SIDE | INPUT PATTERN ON THE RIGHT SIDE | OUTPUT PATTERN | POINTER TO AUX. ELEMENT | SET OF POINTERS TO NODES — 61 |
|---|---|---|---|---|

AUXILIARY ELEMENT

| CLASS ID. OR VARIABLE | OUTPUT PATTERN | POINTER TO NEXT AUX. ELEMENT — 62 |
|---|---|---|

FIG. 11

MAIN NODE

| POINTER TO INPUT DATA | SET OF PTS. TO PARENT SUBNODES | CLASS ID. ON THE LEFT SIDE | OUTPUT PATTERN | FLAG | POINTER TO SUBNODE — 71 |
|---|---|---|---|---|---|

LEAF

| POINTER TO INPUT DATA | SET OF PTS. TO PARENT SUBNODES | CLASS ID. ON THE LEFT SIDE | OUTPUT PATTERN | FLAG — 72 |
|---|---|---|---|---|

SUBNODE

| POINTER TO INPUT DATA | POINTER TO MAIN NODE | CLASS ID. OR VARIABLE | OUTPUT PATTERN | POINTER TO NODE CONNECTOR | POINTER TO NEXT SUBNODE — 73 |
|---|---|---|---|---|---|

NODE CONNECTOR

| POINTER TO CHILD MAIN NODE | POINTER TO NEXT NODE CONNECTOR — 74 |
|---|---|

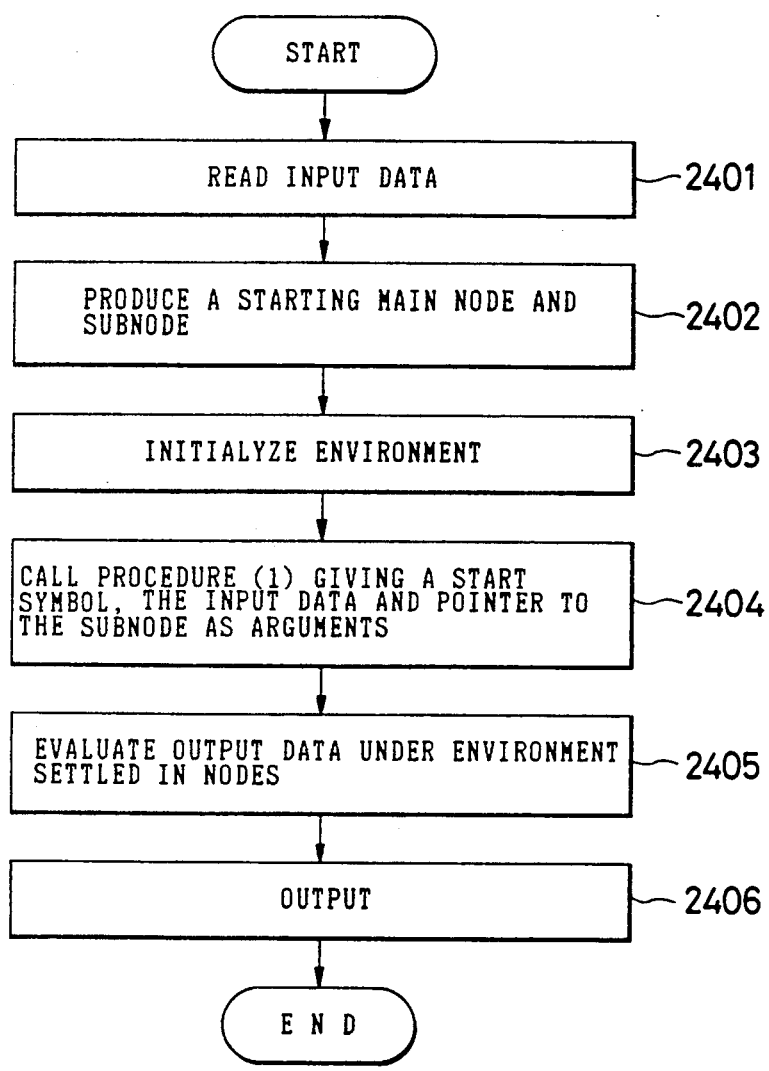

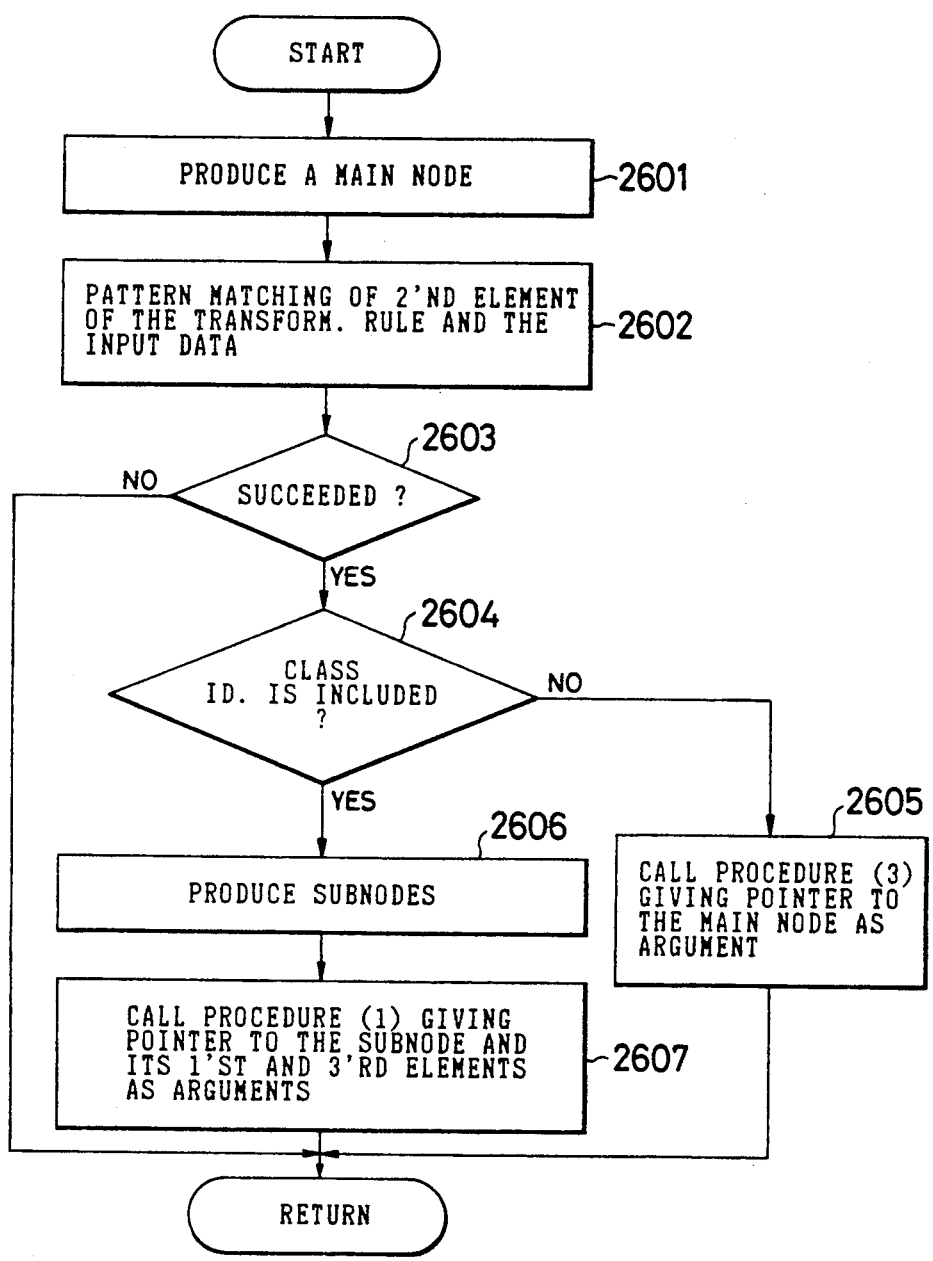

DATA TRANSFORMING METHOD USING EXTERNALLY PROVIDED TRANSFORMATION RULES

BACKGROUND OF THE INVENTION

The present invention relates to data transformation by a data processor, and more particularly to transformation from an input symbol string into an output term and from data of some structure into data of another structure, both performed using transformation rules supplied from the outside. The invention can be applied, for example, to machine translation, program language conversion such as compiling, interpreting of programs, symbolic execution, automatic theorem proving or the like.

In the above-mentioned processings, in many cases, the data transformation is performed through tree-structured data as an intermediate expression. For example, in a compiler, an input sentence as a character string is transformed into a syntax tree expressing the sentence structure in tree structure, and semantic analysis, optimization and code generation are performed on this tree-structured data, whereby the input sentence is transformed into object machine code. This process may be deemed as a process where the input symbol string is transformed according to given rules. Most devices in the prior art to perform such transformation are designed in accordance with individual transformation rules. Consequently, devices being different in design must be prepared for different transformation rules.

An example of transforming means independent of individual transformation rules is software generally called a parser generator, which implements a parsing apparatus to perform syntactic analysis according to an inputted grammar.

In the syntactic analysis, the grammar is usually described in terms of a set P of relations called grammatical rules, rewriting rules, productions, etc., a set T of terminal symbols, a set N of non-terminal symbols and a start symbol s. The grammatical rule is constituted by the left side and the right side, and represents that a symbol string on the left side can be rewritten into a symbol string on the right side. The non-terminal symbol is that which can be rewritten by the set P of the above-mentioned relations, and the terminal symbol is that which cannot be rewritten by the set P. The start symbol s is a special non-terminal symbol, and if the input sentence conforms to the grammar, the start symbol s can be rewritten into this input sentence by applying the set P to the symbol s.

One of grammars of a basic class is a context-free grammar. The context-free grammar is a grammar where the left side of the grammatical rule belonging to the set P is restricted to one non-terminal symbol, and the right side is restricted to a sequence of zero or more terminal symbols and/or non-terminal symbols, that is, a grammer where each grammatical rule is expressed as follows:

A→a A∈N, a∈(N∪T)* where "( )*" represents a set of strings of zero or more elements belonging to either N or T.

In general, in a grammar treated by a parser generator in the prior art, strong restrictions are imposed on the grammatical rules. In compensation for simplification in the parsing mechanism, such a grammar is disadvantageous in that description of sentence structure, i.e., structure of a syntax tree cannot be selected freely. Particularly, the description of a grammar having recursive structure is subjected to significant restrictions.

On the contrary, in DCG (Definite Clause Grammar), the grammar is described in the form of a context-free grammar, and the grammatical rules are deemed as a prolog program and executed by a prolog processing system, whereby the syntactic analysis is carried out. Details of DCG are disclosed in F. Pereira and D. Warren, "Definite Clause Grammars for Language Analysis - A Survey of the Formalism and a Comparison with Augmented Transition Networks", Artificial Intelligence, vol. 13, pp. 231-278 (1980), and an outline thereof will now be described.

DCG expresses the grammar as clauses of first-order predicate logic. According to this construction, parsing a sentence in a language is interpreted as proving a theorem under an axiom system which describes this language. Further, according to a concept that a set of clauses is a program, such theorem proving can be performed automatically. In this sense, a grammar described in DCG is at the same time an axiom system under first-order predicate logic, and further can be executed as a prolog program. The execution of this program is an implementation of a top-down parser of that language.

The notation of DCG is an extension of the notation of the context-free grammar in the following two points. In the following description, a predicate symbol is expressed by a string of small letters, and a variable symbol is expressed by a string of letters starting with a capital letter.

(1) A non-terminal symbol can have an argument.

| Example: | |
|---|---|
| context-free grammar | np |
| DCG | np(X, S) |

(2) On the right side of the grammatical rule, not only a list of non-terminal symbols or terminal symbols but also a procedure call can be written.

| Example: | |
|---|---|
| context-free grammar | name → NAME |
| DCG | name(name(W)) |
| | → [w]. {is_name(W)} | wherein "NAME" appearing on the right side of the context-free grammar is a terminal symbol representing a specific character string belonging to phrase category of "name". "{is_name(W)}" on the right side of DCG represents a call for predicate "is_name(W)" which returns a value "true" when character string "W" is a name.

For example, when a series of grammatical rules starting with

| sentence(s(NP, VP), S0, S) |
| noun_phrase(NP, S0, S1), |
| verb_phrase(VP. S1, S). |

(wherein S0, S1 and S represent positions in a word string) and a dictionary are given as DCG, then the grammatical rules and the dictionary are executed as a prolog program on input sentence

[every,man,loves,mary]

and term sentence(theta,[every,man,loves,mary],[ ])
becomes true. In the above term, "theta" is term ---
s(np(det(every),n(man),rel(nil)),
vp(tv(loves),np(name(mary))))
--- which is equivalent to a syntax tree.

Introduction of the argument and the procedure call term as described above further makes the following manipulations feasible.

(1) Conditions can be given using the procedure call.

---
Example:
date(D,M)
→month(M),[D],
{integer(D),0<D,D<32}.
---

In this example, in the grammatical rule indicating that date of M-th month D-th day is described by phrase (M) representing month and subsequent symbol D, predicate "integer(D)" becoming true when D is an integer, predicate "0<D" becoming true when D is positive, and predicate "D<32" becoming true when D is less than 32 are called, thereby restricting D to an integer larger than 0 and less than 32.

(2) Information depending on the context can be transported and tested using the argument.

---
Example:
sentence(s(NP,VP),SO,S)
→noun_phrase(N,NP,SO,S1),
verb_phrase(N,VP,S1,S).
...
noun(N,n(Root),SO,S)
→[SO,W,S],{is_noun(W,N,Root)}.
trans_verb(N,tv(Root),SO,S)
→[SO,W,S),{is_trans(W,N,Root)}.
...
is_noun(man,singular,man).
is_trans(like,plural,like).
---

In this example, the argument N transporting the number is supplied to "noun_phrase", "verb_phrase" and other non-terminal symbols affected by the number, and the number (singular, plural) given by the dictionary is transported to "noun_phrase" and "verb_phrase". The numbers transported by "noun_phrase" and "verb_phrase" are collated at the level of "sentence", and only when these are coincident the predicate "sentence" becomes true.

Summarizing the above, DCG has the following features.

(1) The grammar is an extension of the context-free grammar.

(2) A parsing apparatus is implemented by executing DCG as a prolog program.

(3) Result of the syntactic analysis is a term given as the argument to the non-terminal symbol used in the syntactic analysis, and an output term different from a simple syntax tree can be obtained depending on what is given as the argument.

(4) A procedure call can be described in the grammatical rule.

(5) A grammatical rule depending on context can be described.

The above-mentioned DCG enhances the syntactic analysis ability and the language conversion ability by introducing the argument and others. However, since DCG describes the grammatical rules and the dictionay as first-order predicate logic and executes this as a prolog program, these grammatical rules and dictionary become one body and cannot be separated. As a result, inconveniences occur in the maintenance (correction, supplement, deletion or the like) of the dictionary, and further the common use of the dictionary for the syntactic analysis and other processing becomes difficult.

Also, processing as a prolog program is of the top-down type. As a result, the left recursive grammatical rule cannot be processed satisfactorily. In other words, if a grammatical rule is given wherein a non-terminal symbol on the left side appears at the left end of the right side, the DCG processing will not terminate.

Further, the main object of DCG is to transform an input sentence into a syntax tree. In order to transform data of some structure into data of another structure using DCG, the structured data for input must be previously decomposed into a character string, and then must be transformed from the character string into structured data for output. Through this procedure, a part of structure information possessed originally by the input data, such as the number of components, is lost and the transformation efficiency is deteriorated.

SUMMARY OF THE INVENTION

An object of the invention is to provide a data transforming system which is powerfull and free from the above-described restrictions.

Another object of the invention is to provide a data transforming system wherein various transformation rules are received from the outside, and according to the received rules an input symbol string can be transformed into an output term efficiently.

Still another object of the invention is to provide a data transforming system wherein various transformation rules are received from the outside, and according to the received rules data of some structure can be transformed into data of another structure efficiently.

In a transforming method from a symbol string to a term according to the invention, transformation rules describing structures of input symbol strings in a manner of description of a context-free grammar and having decsriptions of structures of output terms in association with terminal symbols and non-terminal symbols (e.g., as arguments thereof) are received from the outside. The inputted symbol string is analyzed by reduction processing based on the structures of input symbol strings described in the transformation rules. The analysis establishes correspondence between the terminal and non-terminal symbols and the structure of the inputted symbol string, and these corresponding terminal and non-terminal symbols specify the structure of a term for output corresponding to the inputted symbol string by means of those descriptions of structures of output terms which are associated with these symbols. The term for output is produced in accordance with the descriptions of structures of output terms which are associated with these corresponding terminal symbols and non-terminal symbols.

The description of structure of output term is also associated with the terminal symbol, and through this description a value given by the input symbol is reflected directly on the output term. For example, the phrase category of a symbol and a value to be received from the symbol are described together in a transformation rule. On the contrary, in DCG, in place of describing a phrase category in the grammatical rule, a call for a procedure for determining that the symbol belongs to the phrase category is described. In addition, the structure analysis in the invention is carried out not by the resolution processing but by the reduction processing. As a result, the phrase information (dictionary) and the transformation rule (grammar) can be separated from each other, and therefore the maintenance of the dictionary becomes easy.

Furthermore, since adoption of the reduction processing can avoid the top-down type of analysis processing which is inevitable to the resolution processing, restrictions on available transformation rules are relaxed.

In the foregoing, the reduction processing means that which rewrites the given expression, and the syntactic analysis processing which is performed referring to the grammatical rules directly indicating the manner of rewriting, including the syntactic analysis algorithm of Earley as hereinafter described, belongs to processing of this type. On the contrary, processing which produces binding of all variables to make the goal true as in the execution of the prolog program is called resolution processing. Consequently, the syntactic analysis performed by the execution of DCG as a prolog program is the resolution processing.

In a transforming method from structured data to differently-structured data according to the invention, transformation rules classifying partial structures of data into classes and describing partial structures of input data in terms of relations between these classes and further having descriptions of structures of output data in association with these classes are received from the outside. The inputted structured data are analyzed and the partial structures thereof are classified into the classes. Then, the inputted structured data are restructured into structured data for output in accordance with those descriptions of structures of output data which are associated with the classes corresponding to the partial structures of the inputted structured data.

The above-mentioned classes of partial structures correspond to the non-terminal symbols in the grammatical rules. However, in contrast with the non-terminal symbol producing a character string by application of grammatical rules, the class produces a structured data by application of transformation rules. The input structured data is structured data which is derived by decomposing a class into the classes of the partial structures according to the relations between classes shown in the transformation rules. Conversely, the output structured data is structured data which is obtained by reducing the classes of the partial structures and synthesizing the structures associated with respective classes.

The transformation rule of the above-mentioned type results in concise description of transformation rules without losing the structure information such as the number of components. The above transforming processing makes direct use of the structure information described in the transformation relues for the transforming processing, and avoids reduplicate processings regarding the partial structures to realize efficient processing.

A term obtained by transforming a symbol string according to the invention can become an input to the transformation of structured data according to the invention.

BRIEF DESCRIPTION OF THE DRAWINGS

FIG. 2 is a schematic diagram explaning data transforming process performed in the system of FIG. 1 by way of example;

FIG. 3 is a diagram illustrating formats of the internal expressions of information formed in the course of data processing in the system of FIG. 1;

FIG. 5 is a flowchart illustrating process of analyzing transformation rules in the system of FIG. 1;

FIG. 10 is a diagram illustrating a format of the internal expression of a transformation rule obtained as a result of analysis in the system of FIG. 7;

FIG. 11 is a diagram illustrating formats of intermediate structure information obtained in the course of data transformation in the system of FIG. 7;

FIG. 12A through 12E are flowcharts illustrating in more detail the data transforming process shown in FIGS. 9A through 9C.

DETAILED DESCRIPTION OF THE PREFERRED EMBODIMENT

Figure 1:
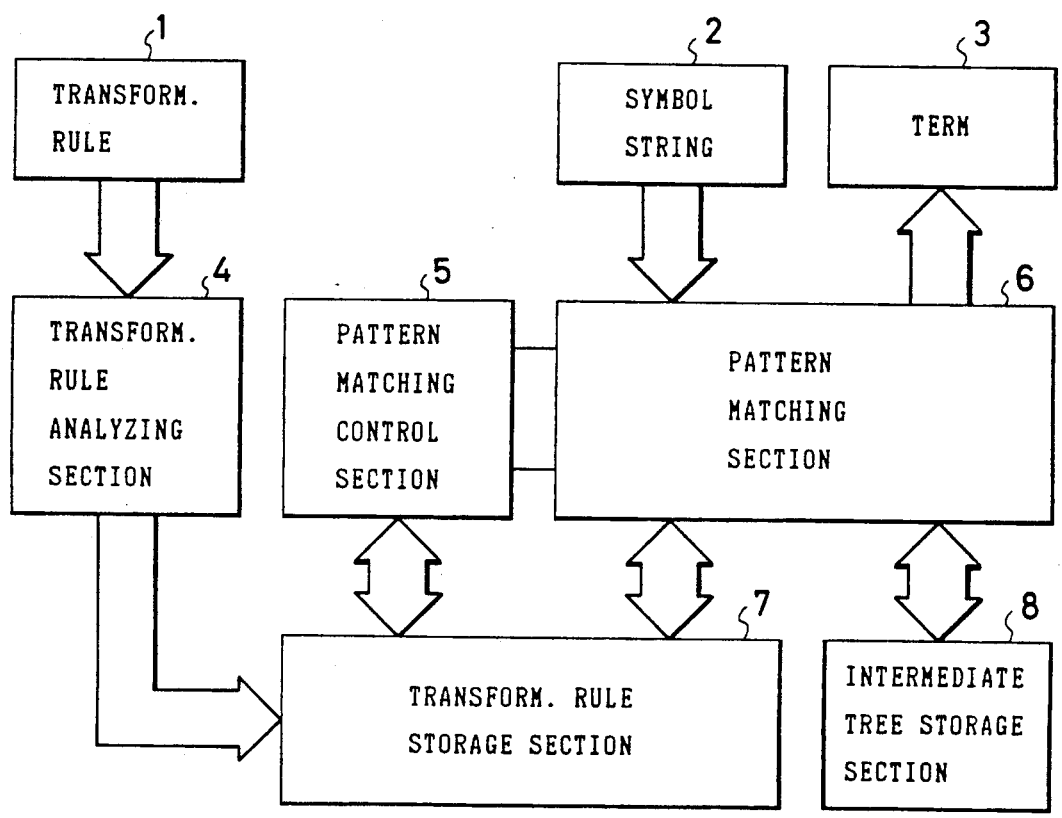
FIG. 1 is a functional block diagram illustrating an example of a processing system for transforming a symbol string to a term according to the invention.

FIG. 1 shows an example of a data processing system for transforming a symbol string to a term according to the invention in the form of a functional block diagram. This system receives transformation rules 1 and a symbol string 2 as inputs, and transforms the symbol string 2 in accordance with the transformation rules 1 and outputs the result as a term 3. The transformation rules 1 are described in the same style as that of the context-free grammar except that non-terminal symbols and terminal symbols can have arguments. A transformation rule analyzing section 4 analizes the transformation rules 1 and converts them into internal expressions. A pattern matching control section 5 controls a pattern matching section 6 based on a parsing algorithm for the context-free grammar (for example, the algorithm of Earley as hereinafter described). The pattern matching section 6 performs pattern matching between the input symbol string 2 and the transformation rules 1 converted into the internal expressions and produces an intermediate tree, and then produces the output term 3 from the intermediate tree by pattern matching. The internal expressions of the transformation rules obtained by conversion in the transformation rule analyzing section 4 are stored in a transformation rule storage section 7, and subsequently read out from the storage section 7 into the pattern matching control section 5 and the pattern matching section 6, and utilized. The intermediate tree produced by the pattern matching section 6 is stored in an intermediate tree storage section 8. Information regarding pattern matching obtained in the transformation process is also stored on this intermediate tree.

A term is defined in terms of functors (i.e., constant symbols having arguments) as follows:

(i) A functor of zero argument is a term.

(ii) When f is a functor of n arguments and t1, t2, ... , $t_n$ are terms, f(t1, t2, ..., $t_n$) is a term.

In the specification, data having a tree structure is expressed by a term. A symbol string is a string of all data which can be expressed within a computer, including a letter string and a term string.

In the embodiment, each transformation rule is characterized by non-terminal symbols. An intermediate tree is expressed in terms of relations between non-terminal symbols on the left side and non-terminal and/or terminal symbols on the right side of the transformation rule. A terminal symbol corresponds to an input symbol, and a non-terminal symbol corresponds to a string of input symbols.

Structures of the output terms are described as arguments of non-terminal symbols and of terminal symbols, whereby nodes of the intermediate tree correspond to nodes of the output term.

An argument of non-terminal symbol and a terminal symbol are described in terms of terms including variables. A term including variables is a term over functors and variable symbols, and defined as follows:

(i) A functor of zero argument is a term including variables.

(ii) A variable symbol is a term including variables.

(iii) When f is a functor of n arguments and t1, t2, ... , $t_n$ are terms including variables, f(t1, t2, ..., tn) is a term including variables.

The functor in the terminal symbol describes a phrase category.

The transformation rule can be expressed as follows.

---

<transformation rule> is expressed as:
  <element> : : = <list of factors>
<list of factors> is expressed as:
  <factor>, <list of factors>
  or <empty>
<factor> is expressed as:
  <element>
  or <terminal symbol>
<element> is expressed as:
  <non-terminal symbol> (sequence of < terms including variables>)
<terminal symbol> is expressed as:
  <term including variables>

---

In the above-mentioned expressions, symbol ": : =" corresponds to grammatical rule symbol "→" in the context-free grammar, and represents regarding the embodiment that the right side can be rewritten to the left side. "<non-terminal symbol>(sequence of<terms including variables>)" represents that a sequence of terms including variables is described in the form of an argument in parentheses following a non-terminal symbol. Plainly speaking, the transformation rule has one "non-terminal symbol (sequence of terms including variables)" on the left side of symbol ": : =", and has a list of "non-terminal symbol (sequence of terms including variables)"s and/or terminal symbols on the right side. The terminal symbol takes the form of a term including variables, and the list may be empty. In the following description, a functor is expressed by a string of small letters, a variable symbol is expressed by a string of small letters with "_", and a non-terminal symbol is expreses by a string of capital letters.

Examples of simple transformation rules will be shown so as to help understanding.

---

Example 1:
  EXPR(add(_x,_y)) ::= id(_x), +, id(_y)

---

In this example, "EXPR" is a non-terminal symbol, and "id(_x)", "+" and "id(_y)" are terminal symbols, and functor "id" is an identifier of a phrase category. Argument "ad(_x,_y)" of EXPR shows the form of an output term, and its variables "_x" and "_y" take specific values as a result of that the values of corresponding variables on the right side are specified by pattern matching with the input symbols.

This transformation rule is given to a processing system, whereby a data transforming system for rewriting input symbol strings in accordance with this transformation rule is implemented. If this data transforming system receives, for example, the symbol string
  id(n)+id(m)
as its input, the system transforms this symbol string into the term
  add(n, m)
and outputs it.

The data transformation is performed in two steps within the processing system. The first step is a step of producing an intermediate tree from the input symbol string, and the second step is a step of producing an output term from the intermediate tree. Respective producings are carried out by replacing variable symbols of terms including variables by corresponding terms determined as a result of pattern matching.

In the step of producing the intermediate tree from the input symbol string, pattern matching is performed between strings of terminal symbols derived from the transformation rules and the input symbol string. In general, there are a plurality of processes to derive the same terminal symbol string, and in the invention, selection from these deriving processes is controlled by syntactic analysis technique of the context-free grammar.

The step of producing the output term from the intermediate tree progresses by performing pattern matching between information obtained from the input symbol string and information recorded in the nodes of the intermediate tree, and replacing the variable symbols of terms including variables by the corresponding terms, in accordance with the intermediate tree.

FIG. 2 shows an outline of the transforming process for the Example 1. The processing system first performs pattern matching between the input symbol string 2 and the transformation rules 1 according to Earley's parsing algorithm for the context-free grammar, and produces an intermediate tree 10 comprising the non-terminal symbol EXPR of the matching transformation rule and its argument add (_x, _y) as a node and the terminal symbols id(_x), +, and id(_y) as leaves. In this process, the variable symbols _x and _y contained in the terminal symbols are replaced respectively by corresponding parts n and m of the input symbol string, and information regarding the replacement is recorded on nodes of the intermediate tree. The output term 3 is produced by performing the pattern matching for the information recorded on the nodes of the intermediate tree. In this example, since the node of the intermediate tree records the term add(_x, _y) including variables described as the argument of the non-terminal symbol corresponding to the node, and the leaves record the terminal symbols id(n) and id(m) whose variable symbols have been replaced, the variable symbols contained in the former are replaced by the values of the latter in accordance with relation of parent and child in the nodes of the intermediate tree, i.e., relation between the left side and the right side of the transformation rule, whereby the output term add(n, m) is produced.

In the invention, different transformations can be performed by only replacing the transformation rules 1 without changing the sections 4–8. The following two examples further exemplify, transformation rules.

```
Example 2:
INSTRUCTION(instr(pushea,id(_name),_code,store))
    ::= id(_name),:=,EXPR(_code)           ;
EXPR(instr(_code1,_code3,add))
    ::= EXPR(_code1),+,FACT(_code3)        ;
EXPR(_code)
    ::= FACT(_code)                        ;
FACT(instr(push,id(_name)))
    ::= id(_name)                          ;
Example 3:
INSTRUCTION(list(_code,instr(store,id(_name))))
    ::= id(_name),:=,EXPR(_code)           ;
EXPR(list(_code,instr(adda,addr)))
    ::= EXPR(_code),+,FACT(_addr)          ;
EXPR(instr(loada,_addr))
    ::= FACT(_addr)                        ;
FACT(id(_name))
    ::= id(_name)                          ;
```

The processing system supplied with the transformation rules of Example 2 transforms the symbol string
  id(n):=id(n)+id(m)
into the term

```
        instr(pushea,id(n),
        instr(instr(push ,id(n)),
        instr(push ,id(m)),
        add)
        store)
``` and outputs it. This term can be interpreted and executed by a computer with a push-down stack.

On the other hand, the procissing system supplied with the transformation rules of Example 3 transforms the symbol string
  id(n):=id(n)+id(m)
into the term

```
        list(list(instr(loada,id(n)),
             instr(adda ,id(m))),
             instr(store,id(n)))
``` and outputs it. This term can be interpreted and executed by a computer with an accumulator.

Also in the invention, since pattern matching is used in transformation, context-dependent transformation some types of rules can be described using variable symbols appearing in the transformation rules.

Example 4:

```
EXPR(double(_x)) ::= id(_x),+,id(_x)
```

The processing system supplied with the above rule receives the symbol string
  id(n)+id(n)
and transforms it into the term
  double(n)
and then outputs it, but receives the symbol string
  id(n)+id(m)
and outputs "syntactic error".

In the embodiment, the parsing algorithm of Earley is utilized as described above. Details of this algorithm are disclosed, for example, in Jay. Earley, "An Efficient Context-Free Parsing Algorithm", CACM Vol. 13, No. 2, Feb. 1970, pp. 94–102, and therefore only an outline will be described here. The algorithm introduces "state" comprising a marked production rule (dotted-rule) obtained by inserting a mark (dot) in the symbol string on the right side of a production rule (grammatical rule) and a position along the word string of an input sentence. It produces several states every time one word of the input sentence is read, and collects these states into a set, thereby managing the production rules being applied during process of syntactic analysis. Each state means that the symbol string to the left of the mark on the right side of the marked production rule can be rewritten to the word string, and expresses the application state of the corresponding production rule.

A syntax tree is expressed by providing a string of pointers corresponding to the states, each pointers corresponding to the symbol string to the left of the mark on the right side of a marked production rule and pointing to a state applied in rewriting each symbol. In the context-free grammar, in general, there are a plurality of production rules which can be applied in rewriting one symbol, and this is solved by collecting the pointers into a set. The collecting of the pointers into a set corresponds to that a plurality of syntax trees are expressed in superposition by using nodes in common.

Describing this in more detail, for any production rule $D_p \rightarrow C_{p1} \cdots C_{pr}$ a production rule with mark (*) is represented by $D_p \rightarrow C_{p1} \cdots C_{pj}* C_{pj+1} \cdots C_{pr}$ wherein $D_p$ is a non-terminal symbol, and $C_{ph}$ ($1 \leq h \leq r$) may be either a non-terminal symbol or a terminal symbol. The input sentence is a string of words $w_i$ ($1 \leq i \leq n$), and an arbitrary part thereof $w_{k+1} \ldots w_m$ ($0 \leq k \leq m \leq n$) is represented by a pair km of integers. Then a state is represented by $<D_p \rightarrow C_{p1} \cdots C_{pj}* C_{pj+1} \cdots C_{pr}, km>$ The algorithm for producing a set S of states and outputting a syntax tree gives $<s \rightarrow * C_{p1} \cdots C_{pr}, 00>$ as the initial state, and then selectively applies three sorts of operations called Predictor, Completer and Scanner.

(1) Predictor

If $$<D_p \to C_{pl} \cdots C_{pt}^* \; C_{pt+1} \cdots C_{pr}, im> \in S$$

and $C_{pt+1}$ is a non-terminal symbol, then the state $$<C_{pt+1} \to^* C_{ql} \cdots \cdots C_{qs}, mm>$$

is added (except for the case that it already exists) to S.

(2) Completer

When $$<C_{qt+1} \to C_{pl} \cdots \cdots C_{pr}^*, im> \in S$$

and $$<D_q \to C_{ql} \cdots C_{qt}^* \; C_{qt+1} \cdots C_{qs}, ji> \in S$$

and if the state $$<D_q \to C_{ql} \cdots C_{qt+1}^* \; C_{qt+2} \cdots C_{qs}, jm>$$

exists in S, then a pointer from the instance of $C_{qt+1}$ to $$<C_{qt+1} \to C_{pl} \cdots \cdots C_{pr}^*, im>$$

is provided. If that state does not exists, then $$<D_q \to C_{ql} \cdots C_{qt+1}^* \; C_{qt+2} \cdots C_{qs}, jm>$$

is added to S, and a pointer from the instance of $C_{qt+1}$ to $$<C_{qt+1} \to C_{pl} \cdots \cdots C_{pr}^*, im>$$

is provided.

(3) Scanner

If $$<D_p \to C_{pl} \cdots C_{pt}^* \; C_{pt+1} \cdots C_{pr}, im> \in Sl$$

and $C_{p+1}$ is a terminal symbol and $C_{pt+1} = w_{m+1}$, then $$<D_p \to C_{pl} \cdots C_{pt+1}^* \; C_{pt+2} \cdots, i \; m+1>$$

is added (except for the case that it already exists) to $S_{i+1}$.

Finally, if $$<s \to C_{pl} \cdots \cdots C_{pr}^*, 0m> \in S$$

is obtained, the instance of this state is outputted as a syntax tree. However, if this state is not obtained, rejection is returned.

The parsing algorithm of Earley can be applied to syntactic analysis based on any context-free grammar, and when the grammar has ambiguity (a plurality of syntax trees apply to one sentence), it produces all syntax trees which can be produced from the given input sentence without reduplicate processings.

Each functional block in FIG. 1 can be realized either by hardware or by software, but an embodiment by software on a data processing system provided with a usual input/output device, a storage device and a CPU will be hereinafter described.

FIG. 3 shows an example of formats of internal expressions of information stored in the transformation rule storage section 7 and the intermediate tree storage section 8. A transformation rule element 41 is the internal expression of part of a transformation rule which is obtained by analysis in the transformation rule analyzing section 4 and stored in the transformation rule storage section 7. Counting from left to right, the first element is a non-terminal symbol on the left side of the transformation rule, the second element, i.e., input pattern is one of terminal symbols or non-terminal symbols on the right side, and the third element, i.e., output term pattern is a factor on the left of a factor recorded as the second element. However, if the corresponding factor is not a term including variables, the third element is empty, or if the second element is a factor at the left end of the right side, the third element is the argument of the non-terminal symbol on the left side. The fourth element is a pointer to a node-set constructor as hereinafter described. The transformation rule analyzing section 4 produces a sequence of such transformation rule elements 41 for each transformation rule. The second element of the last transformation rule element in the sequence is always empty. Consequently, the number of the transformation rule elements produced for each transformation rule is one plus the number of the factors on the right side. Information units denoted by reference numerals 42-45 are produced by the pattern matching section 6 and stored in the intermediate tree storage section 8. A node-set constructor 42 interlinks node connectors as described hereinafter in a list form, and also links a node set to another node set. Its first element is a pointer to a node connector, and the second element is a pointer to a node-set constructor of another intermediate tree possessing a node in common. The first element of a node connector 43 is a pointer to a node, and the second element is a pointer to a node-set constructor of a node in relation of brothers. An intermediate tree node 44 and an intermediate tree leaf 45 hold pattern matching environments, i.e., information regarding pattern matching obtained during process of the transformation, as respective second elements. Input symbol positions are held as respective first elements in order to indicate at what step of the data transformation the pattern matching environment was obtained. In the embodiment, boundaries between successive input symbols are identified by sequent integers, and a pair of integers to identify the boundaries before and after an input symbol or a series of input symbols are used as the input symbol position. The intermediate tree node 44 further has a pointer to a node-set constructor as the third element.

Figure 4:
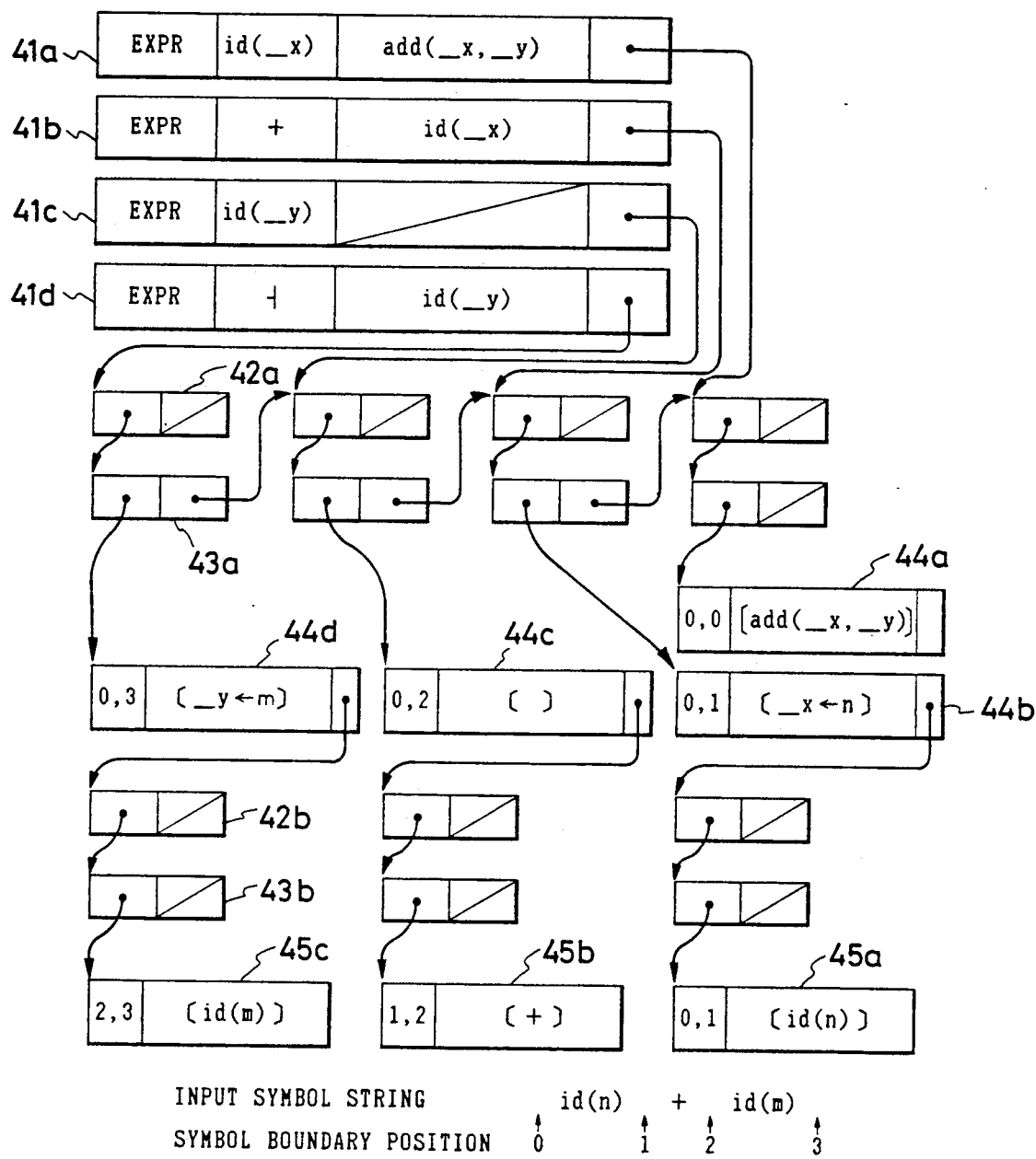
FIG. 4 is a diagram illustrating the internal expressions of FIG. 3 for the example of transforming process shown in FIG. 2.

FIG. 4 shows a specific example of internal expressions shown in FIG. 3 for the example shown in FIG. 2. For the transformation rule of Example 1, that is, EXPR(add(_x,_y))::=id(_x),+,id(_y)

transformation rule elements 41a-41c having respective factor on the right side thereof as input patterns (second elements) are produced, and further a transformation rule element 41d having a special symbol indicating empty as input pattern is added. In the starting transformation rule element 41a, the input pattern (second element) is factor id(_x) at the left end of the right side of the transformation rule, and the output term pattern (third element) is argument add(_x,_y) of the non-terminal symbol on the left side. In the third transformation rule element 41c, the rule factor on the left of the input pattern id(_y) is a constant "+" and therefore the output term pattern is empty.

The intermediate tree in this example comprises nodes 44a-44d and leaves 45a-45c, and the nodes 44a-44d are linked to the corresponding transformation rule elements by a train of node-set constructors 42a and a train of node connectors 43a, and also linked to each other so as to form a set of nodes. The set of nodes can be deemed as a macroscopic single node corresponding to the non-terminal symbol EXPR on the left side of the transformation rule to which it is linked. From this point of view, individual nodes 44 should be called node elements, but as long as there is no fear of confusion these are also called nodes. The node 44a linked to the starting transformation rule element 41a has the output term pattern (third element) in the transformation rule element, i.e., the argument of the non-terminal symbol on the left side as the pattern matching environment (second element , and the other nodes 44b through 44d have as respective pattern matching environments binding conditions of variables to the output term patterns in the transformation rule elements to which they are linked. Each binding condition is obtained as a result of pattern matching between the input pattern in the transformation rule element immediately before the present element and the input symbol at position corresponding to that input pattern. The pattern matching environment in the node 44c does not show any binding condition. It is because the output term pattern (third element) of the transformation rule element linked to this node is empty (the input pattern (second element) of the preceding transformation rule element 41b is a constant). The nodes 44b through 44d are also linked to the leaves 45a through 45c respectively by the node-set conttstructors 42b and the node connectors 43b. The pattern matching environment in each leaf is the input symbol matching with the terminal symbol which is contained as the input pattern in the transformation rule element immediately before the transformation rule element linked to this leaf through a node. How to set the symbol position (first element of the node and leaf) will be apparent from the transforming process described later.

Processing in the embodiment will now be described referring to flowcharts in FIG. 5 and FIGS. 6A through 6F. FIG. 5 is a flowchart of analysis of transformation rules, and this processing relates to analysis of the transformation rules 1 and conversion thereof into internal expressions (sequences of the transformation rule elements 41).

When the transformation rules 1 and a start symbol are given, the transformation rule analyzing section 4 reads these rules (step 601), disjoints <list of factors> on the right side of earch transformation rule into <factor> s (step 602), and produces an internal expression, i.e., a transformation rule element 41 for each pair of factor and a non-terminal symbol on the left side (step 603), and then chains these internal expressions (step 604). Further, in order to facilitate retrieval of the transformation rules, the rule analyzing section 4 chains the transformation rule elements having the same non-terminal symbol, and marks the start symbol (step 605), and stores these elements in the transformation rule storage section 7 (606), whereupon the processing is finished. The internal expression for each disjointed factor becomes a core of a child node in producing the intermediate tree.

FIGS. 6A through 6F illustrate in detail the data transformation processing, which is a modified Earley's algorithm.

Figure 6A:
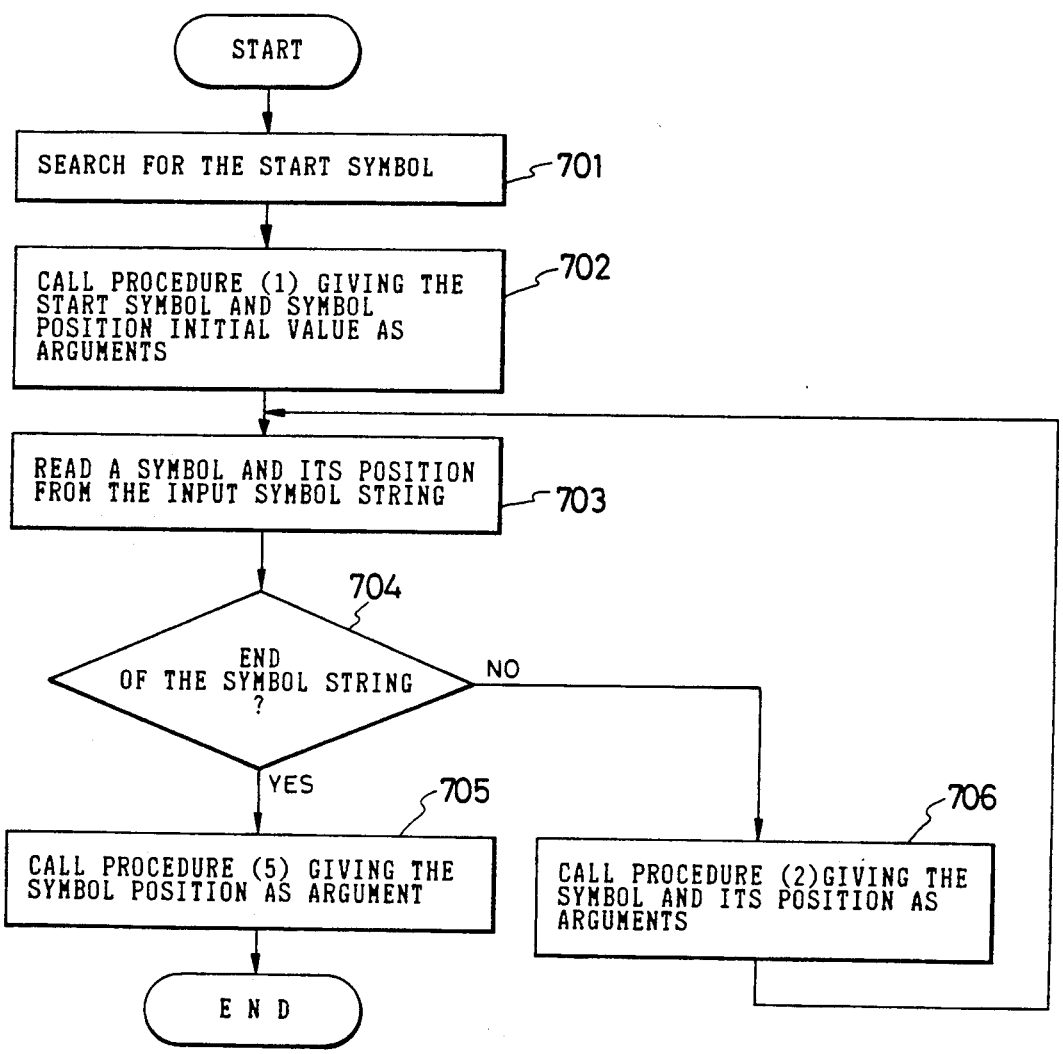
FIGS. 6A through 6F are flowcharts illustrating process of data transforming processing in the system of FIG. 1.

FIG. 6A is a flowchart showing an outline of the entire data transformation processing, and relates to start and end of the transformation processing, reading of the symbol string, and output of the term. When the processing system is started, the pattern matching control section 5 searches for the marked non-terminal symbol (start symbol) (step 701), and calls procedure (1), giving this non-terminal symbol and the symbol position initial value (0, 0) as arguments (step 702). After finishing the processing of the procedure (1), the pattern matching control section 5 reads a symbol and its symbol position from the input symbol string 2 (step 703). If the read symbol is a special symbol indicating the end of the symbol string (step 704), procedure (5) is called, taking the symbol position thereof and the start symbol as arguments (step 705), and the produced term is outputted. If not so, procedure (2) is called, taking the read symbol and its symbol position as arguments (step 706), and after finishing the processing, process is returned to the step 703 and the processing of a succeeding symbol is performed.

Figure 6B:
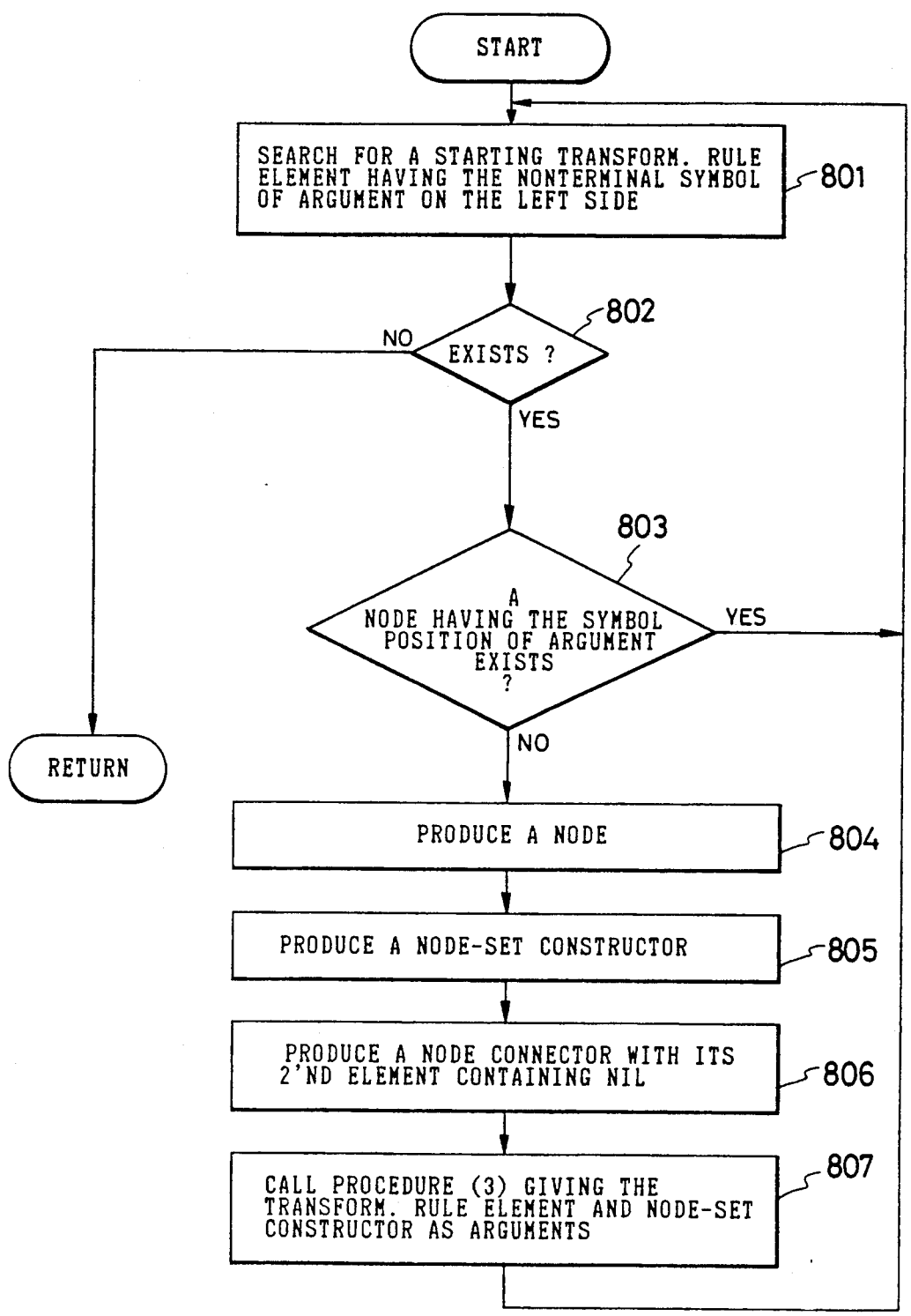

FIG. 6B is a flowchart of procedure (1). This procedure relates to search for the terminal symbol which may possibly be read succeedingly and producing of the intermediate tree node, and corresponds to the Predictor in the algorithm of Earley. Procedure (1) is provided with a non-terminal symbol and a symbol position as arguments, and searches the transformation rule storage section 7 for a starting transformation rule element having the non-terminal symbol of argument on the left side (step 801). If all of such starting transformation rule elements have been finished (step 802), a return takes place. If not so, the intermediate tree node linked to the detected transformation rule element is examined, and if a node having the symbol position of argument already exists (step 803), process returnes to the step 801 and another starting transformation rule element is searched for. On the other hand, if such a node does not exist, an intermediate tree node is produced (step 804). In the pattern matching environment (second element) of this intermediate tree node, the output term pattern of the starting transformation rule element, i.e., the argument of the non-terminal symbol on the left side is written. Next, a node-set constructor is produced (step 805) and further a node connector is produced (step 806), and by these the node produced in the step 804 is linked to the transformation rule element detected in the step 801. A pointer (second element) to the node-set constructor in the node connector is set nil as the initial value. Next, procedure (1) gives the transformation rule element detected in the step 801 and the node-set constructor produced in the step 805 as arguments and calls procudure (3) (step 807), and then returnes to the step 801 in searche of another transformation rule element. In the example of FIG. 4, according to the procedure (1), the node 44a is procduced and linked to the transformation rule element 41a.

Figure 6C:
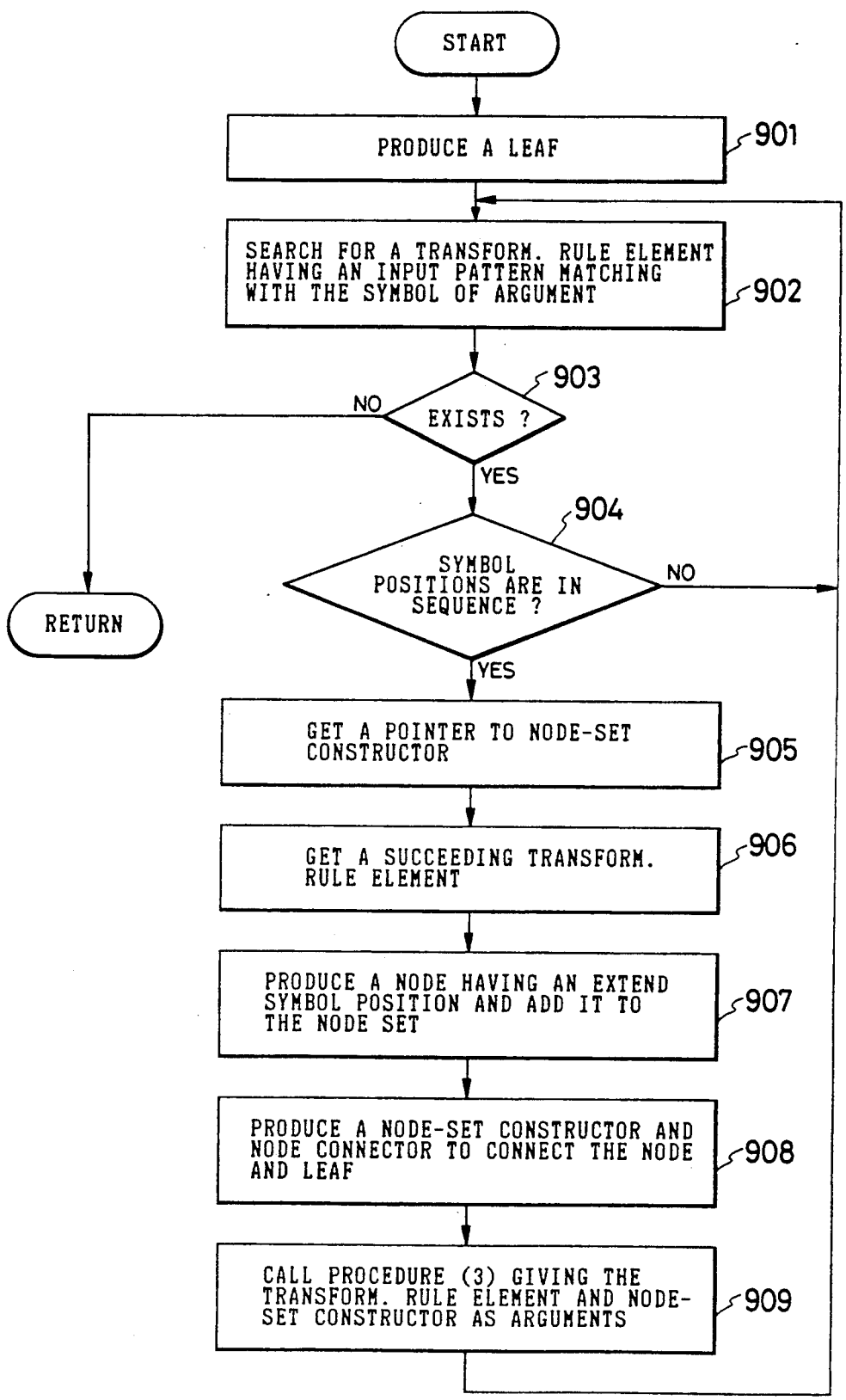

FIG. 6C is a flowchart of procedure (2). This procedure relates to pattern matching of the terminal symbol and the input symbol and producing of the intermediate tree leaf and node, and corresponding to the Scanner in the algorithm of Earley. Procedure (2) takes an input symbol and its symbol position as arguments, and produces an intermediate tree leaf having the symbol and the symbol position of arguments as the pattern matching environment (second element) and the symbol position (first element), respectively (step 901). Among the transformation rule elements in waiting state, that having an input pattern (second element) matching with the symbol of argument is searched for (step 902), and the waiting state of the examined transformation rule element is cancelled. The waiting state of the transformation rule element has been set by procedure (3) as described later. If such transformation rule elements do not exist or have all been processed (step 903), a return takes place. If not so, the intermediate tree node linked to the detected transformation rule element is examined, and if the symbol position in the node and the symbol position of argument are not in sequence (step 904), a return to the step 902 takes place and a succeeding rule element is searched for. On the other hand, if these symbol positions are in sequence, procedure (2) gets a pointer to the node-set constructor linked to the transformation rule element obtained in the step 902 (step 905), and then gets a succeeding transformation rule element chained to the transformation rule element obtained in the step 902 from the transformation rule storage section 7 (step 906), and then produces a intermediate tree mode and so produces node-set constructor and a node connector having the pointer obtained in the step 905 as its second element, and adds the produced intermediate tree node to the set of intermediate tree nodes linked to these transformation rule elements (step 907). The symbl position in this intermediate tree node has the end extended to the symbol position of argument, and the pattern matching environment is the binding condition for variable as a result of matching in the step 902. Procedure (2) further produces a node-set constructor and a node connector so that the intermediate tree leaf produced in the step 901 is linked to the intermediate tree node produced in the step 907 (step 908), and calls procedure (3) giving the transformation rule element detected in the step 906 and the node-set constructor produced in the step 907 as arguments (step 909), and then process is returned ot the step 902 and a succeeding transformation rule element is searched for. In the example of FIG. 4, according to this procedure (2), the leaves 45a through 45c and the nodes 44b through 44d are produced in sequence.

Figure 6D:
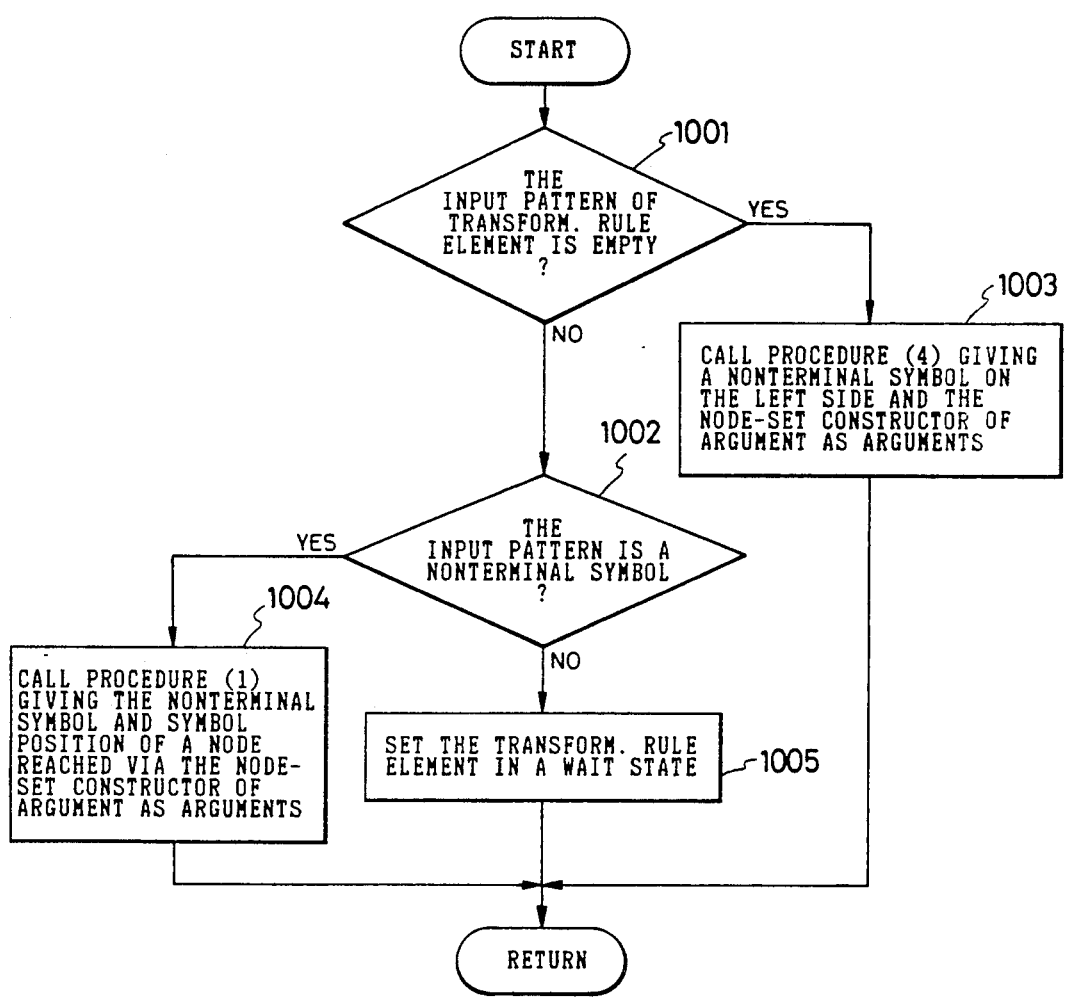

FIG. 6D is a flowchart of procedure (3), and this procedure selects a processing to be performed subsequently according to the sort of input pattern (second element) in the transformation rule elements. Arguments of procedure (3) are a transformation rule element and a node-set constructor. If the input pattern in the transformation rule element of argument is empty (the end of the transformation rule) (step 1001), procedure (4) is called, taking the non-terminal symbol on the left side and the node-set constructor of the argument as arguments (step 1003). If the input pattern is a non-terminal symbol (step 1002), procedure (1) is called, taking this non-terminal symbol and a symbol position in a node reached via the node-set constructor of argument as arguments (step 1004), and if the input pattern is a terminal symbol, the transformation rule element is set in a wait state (step 1005).

Figure 6E:
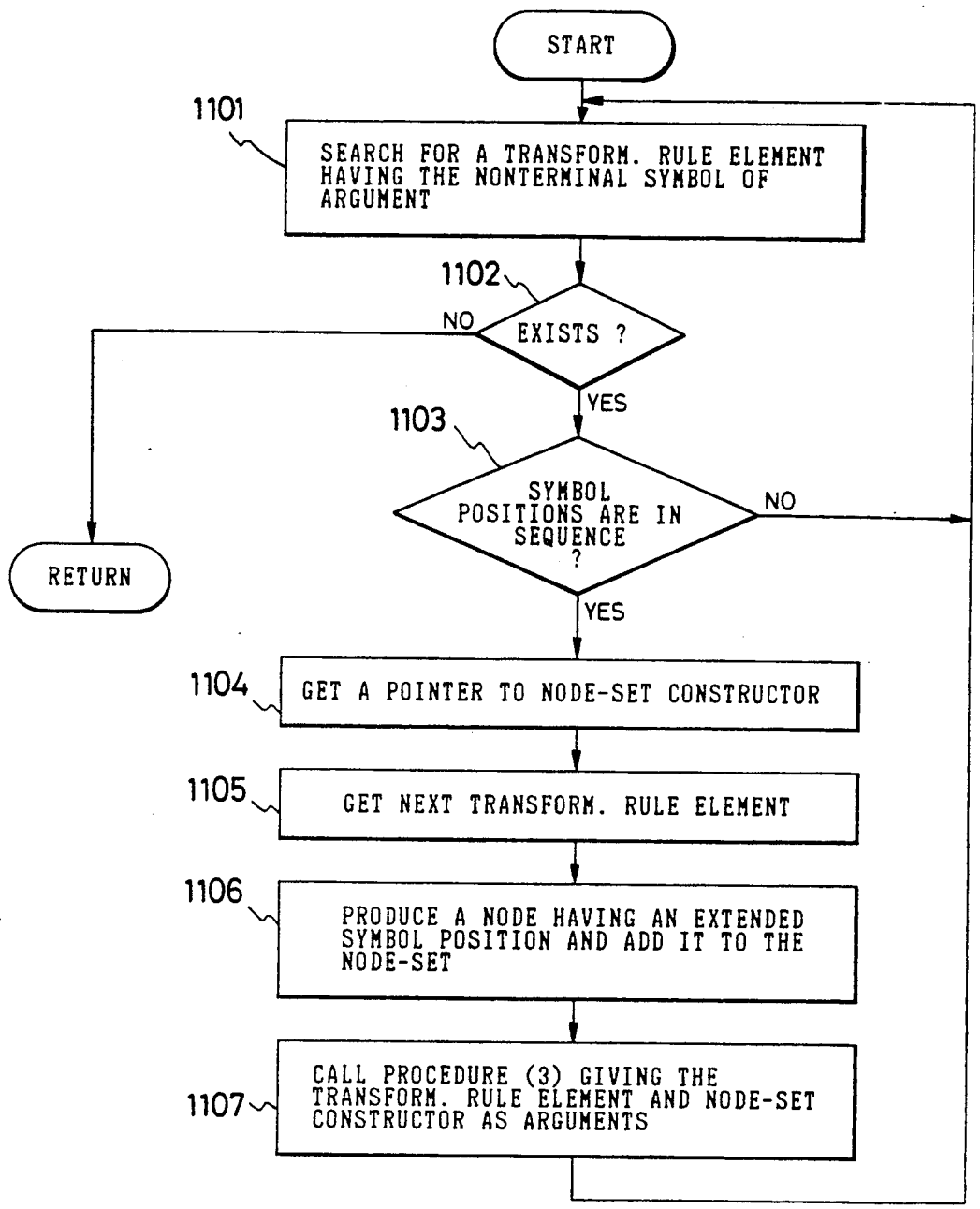

FIG. 6E is a flowchart of procedure (4). This procedure relates to producing of intermediate tree nodes and arrangement of pattern matching environments for producing the output term, and corresponds to the Completer in the algorithm of Earley. Arguments of procedure (4) are a non-terminal symbol and a node-set constructor. In procedure (4), a transformation rule element having the non-terminal symbol of argument as the input pattern (second element) is searched for in the transformation rule storage section 7 (step 1101). If all such transformation rule elements have been processed (step 1102), a return takes place. If not so, the intermediate tree node linked to the detected transformation rule element is examined, and if its symbol position and the symbol position of the intermediate tree node attained directly via the node-set constructor of argument are not in sequence (step 1103), process is returned to the step 1101 and another transformation rule element is searched for. On the other hand, if the symbol positions are in sequence, a pointer to the node-set constructor linked to the transformation rule element detected in the step 1101 is got (step 1104), and then a succeeding transformation rule element chained to the transformation rule element detected in the step 1101 is got (step 1105). Next, an intermediate tree node is produced, and also a node-set constructor and a node connector having the pointer got in the step 1104 as the second element are produced, and the produced intermediate tree node is added to the set of intermediate tree nodes linked to these transformation rule elements (step 1106). The symbol position in this intermediate tree node has the end extended to the symbol position of the intermediate tree node directly attained via the node-set constructor of argument, and its pointer to a node-set constructor is set to indicate the node-set constructor of argument. Further in procedure (4), the output term pattern (third element) of the transformation rule element obtained in th step 1105 is evaluated under the pattern matching environments in the set of intermediate tree nodes attained via the node-set constructor of argument. The resultant pattern matching information is recorded as the pattern matching environment of the intermediate tree node produced in the step 1106. Next, procedure (3) is called, taking the transformation rule element obtained in the step 1104 and the node-set constructor produced in the step 1106 as arguments (1107). After finishing the processing in procefure (3), process is returned ot he step 1101 to get another transformation rule element. In FIG. 4, portions regarding procedure (4) are not shown for simplification.

Figure 6F:
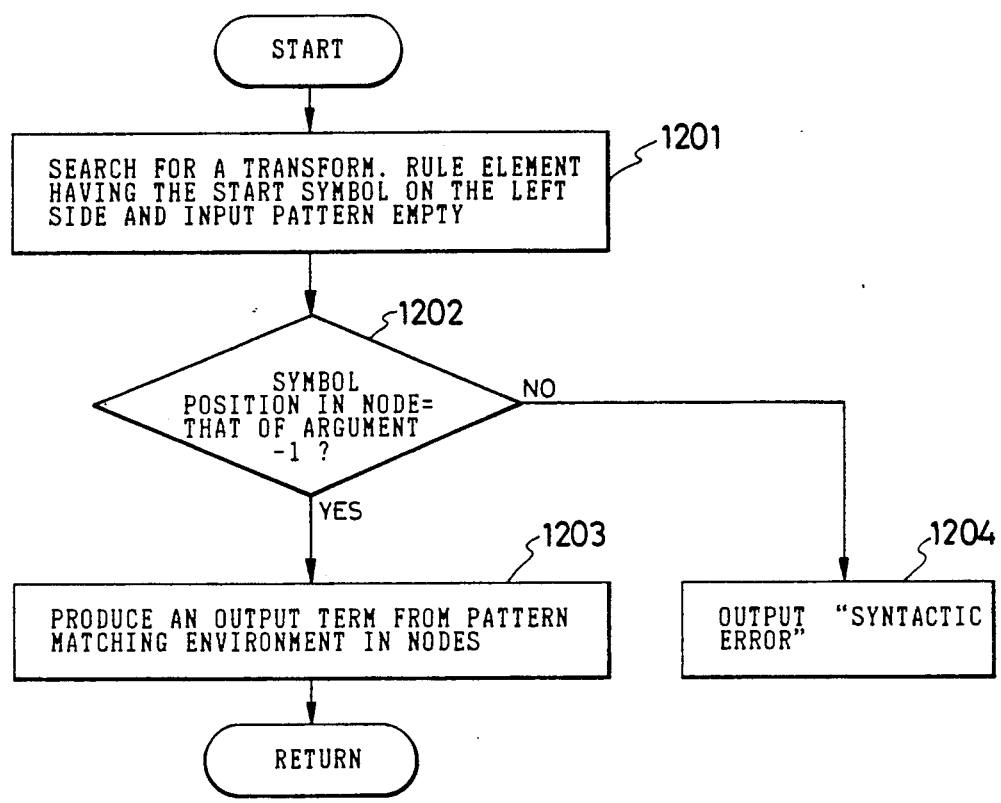

FIG. 6F is a flowchart of procedure (5) called by step 705 of FIG. 6A, and relates to producing of the output term. In procedure (5) with the start symbol and the symbol position of a special symbol indicating the end of the symbol string as arguments, a transformation rule element having the start symbol on the left side and the input pattern empty is obtained from the transformation rule storage section 7 (step 1201). If the symbol position in the intermediate tree node linked to the obtained transformation rule element is "the symbol position given as the argument $-1$", the nodes linked thereto are hunted up by tracing the node connectors and node-set constructors, and the pattern matching environments recorded in these intermediate tree nodes are brought to effect. Thus, the variable symbols in the terms including variables in these nodes are replaced by turns with the terms which have the variables replaced, and the output term is produced (step 1203). If not so, "syntactic error" is outputted (step 1204). In the example of FIG. 4, in which "EXPR" is the start symbol, step 1202 finds the transformation rule element 41d to which the node 44d is linked, and the nodes 44c–44a are hunted up. Then, the variables "_x" and "_y" in the node 44a are replaced according to the matching environments in the nodes 44d and 44b to produce the output term "add(m,n)".

According to this embodiment, producing of states and producing of the intermediate tree can be performed simultaneously in structure analysis of the symbol string. Also, since the node connectors are collected into a set, a plurality of intermediate trees are expressed in superposition, whereby the memory size occupied by the intermediate trees can be reduced. Further, the intermediate tree nodes are used in common, resulting in that the intermediate trees with nodes appearing repeatedly infinite number of times can be produced in a finite time. Example 5 of the transformation rules shown below utilizes this feature and describes adding of natural numbers.

```
Example 5:
ADDEXPR(_sum)
   ::= NATNUM(_num1),+,NATNUM(_num2),
       ADD(_num1,_num2,_sum)                ;
NATNUM(succ(_num))
   ::= succ(,NATNUM(_num),)                 ;
NATNUM(zero)
   ::= zero                                 ;
ADD(succ(_num1),num2,succ(_sum))
   ::= ADD(_num1,_num2,_sum)                ;
ADD(zero,_num2,num2)
   ::=                                      ;
```

In the processing system supplied with the transformation rules of Example 5, if letter string
   succ(zero)+succ(succ(zero))
is inputted, term
   succ(succ(succ(zero)))
is outputted. In this transformation, an infinite number of intermediate trees are produced corresponding to the number of ADD nodes derived in the process of pattern matching. In the embodiment, a plurality of intermediate trees are superposed, whereby all these trees are simultaneously managed. A selection from these trees is made by pattern matching at the step of producing a term from the intermediate trees. For the example shown above, ADD node succeeds in pattern matching for two intermediate trees.

This invention may be modified so that, in the step of producing the intermediate tree, the state of syntactic analysis is separated from the intermediate tree, and the states are produced first and then the intermediate trees are produced one by one. Procedure (1), procedure (2) and procedure (4) of the embodiment can be implemented as independent execution units which permit parallel processing.

The expression of the position of the input symbol employed in the embodiment may be replaced by other information which identifies the position of each symbol and indicates the relation to other symbols before and after it. As an example, a pair of a pointer to the symbol and a pointer to the node may be adopted. Also, the internal expression shown in FIG. 4 may be replaced by another expression having the same logical meaning, for example, expression by a table. Further, although the node-set constructor and the node connector are introduced in the embodiment to express the intermediate tree, the intermediate tree may be expressed using other notation.

In the description of the transformation rule, associating of the terminal symbol and the non-terminal symbol with the term including variables can be described in a format other than argument. An example is shown below. <transformation rule> is expressed as:

```
<non-terminal symbol> ::= <list of factors>
    /sequence of <terms including variables>/
<list of factors> is expressed as:
    <factor>, <list of factors>
    or <empty>
```

-continued
```
<factor> is expressed as:
    <element>
    or <terminal symbol>
<element> is expressed as:
    <non-terminal symbol> (sequence of <terms including
        variables>)
```

In this description format, the sequence of <terms including variables> associated with the non-terminal symbol on the left side is described at the end of the right side sandwiched between a pair of slant line symbols. According to this description format, the transformation rules of Example 2 are described as follows.

```
Example 6:
INSTRUCTION
   ::= id(_name),:=,EXPR(_code)
       /instr(pushea,id(_name),_code,store)/
EXPR
   ::= EXPR(_code1),+,FACT(_code3)
       /instr(_code1,_code3,add)/
EXPR
   ::= FACT(_code)
       /_code/
FACT
   ::= id(_name)
       /instr(push,id(_name))/
```

In this case, processing in the transformation rule analyzing section 4 may be partly changed and the same processing as that for Example 2 can be performed without changing the internal expression of the transformation rule.

Figure 7:
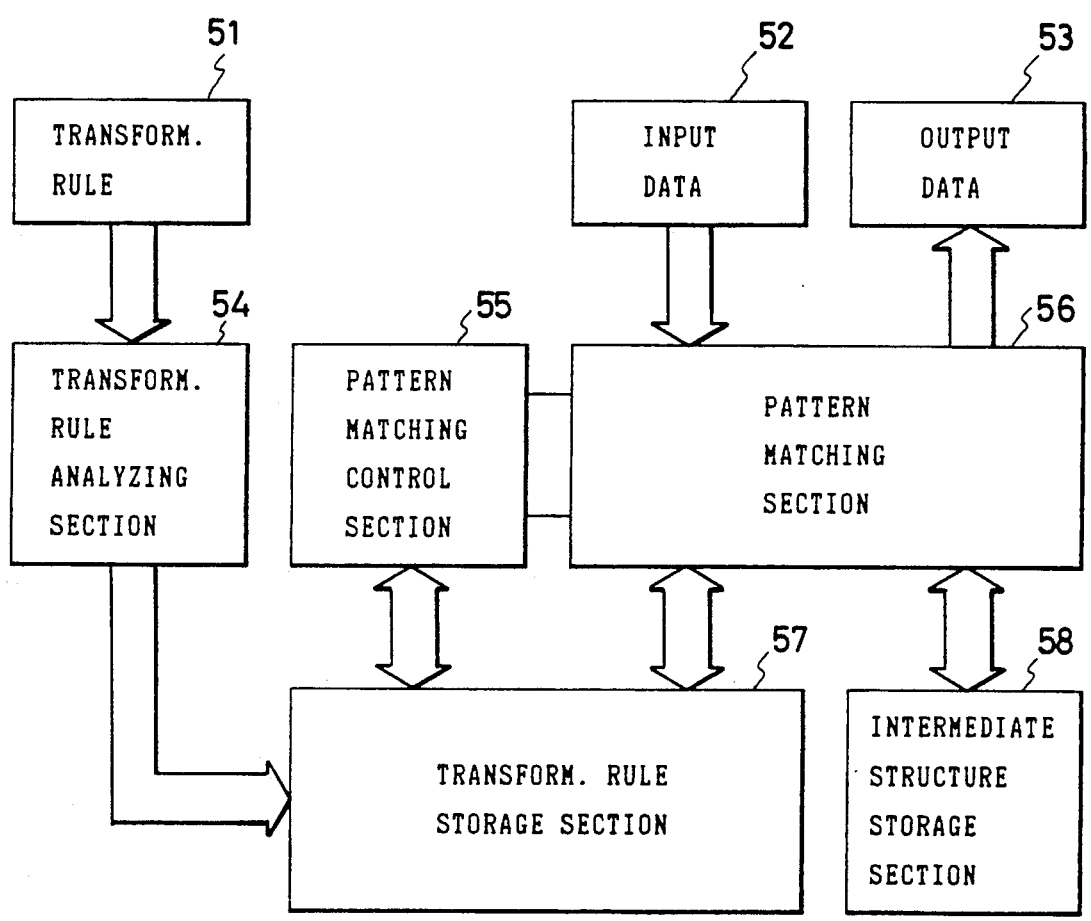
FIG. 7 is a functional block diagram illustrating an example of a data processing system for transforming structured data according to the invention.

FIG. 7 shows an example of a data processing system executing transformation of structured data according to the invention in the form of a functional block diagram. This system receives transformation rules 51 and input structured data 52 as inputs, and transforms the input structured data 52 in accordance with the transformation rules 51 and then outputs output structured data 53. A transformation rule analyzing section 54 analyzes the inputted transformation rules 51, and converts them into internal expression. A pattern matching control section 55 selects transformation rules to be supplied to a pattern maching section 56, and controls formation by the pattern matching section 56 of intermediate structure information and the output data 53. The pattern matching section 56 executes pattern matching between the input data 52 and the transformation rules 51 and between the transformation rules 51 and the intermediate structure. A transformation rule storage section 57 stores internal expressions of the transformation rules obtained by conversion in the transformation rule analyzing section 54, and an intermediate structure storage section 58 stores the intermediate structure data formed by the pattern matching section 56 and information obtained in the process of transformation.

The structured data is expressed by a term, and the term is defined in terms of functors (i.e., constant symbols having arguments) as follows.

(i) A functor of zero argument is a term.

(ii) When f is a functor of n arguments and r1, r2, . . . , $r_n$ are terms, f(r1, r2, . . . , $r_n$) is a term.

A term including variables is a term over functors and variable symbols, and defined as follows:

(i) A functor of zero argument is a term including variables.

(ii) A variable symbol is a term including variables.

(iii) When g is a functor of m arguments and s1, s2, ..., $S_m$ are terms including variables, g(s1, s2, ..., $S_m$) is a term including variables.

Partial structures of structures which can be taken by the structured data is classified into classes, and each class is identified by a class identifier. A term including class identifiers is a term over functors, variable symbols and class identifiers, and defined as follows:

(i) A functor of zero argument is a term including class identifiers.

(ii) A variable symbol is a term including class identifiers.

(iii) A class identifier is a term including class identifiers.

(iv) When h is a funtor of n arguments and t1, t2, ..., $t_n$ are terms including class identifiers, h(t1, t2, ..., $t_n$) is a term including class identifiers.

The class is defined using classes of partial structure to constitute it as follows.

---
<class definition> is expressed as:
class identifier = =
term including class identifiers
---

In this definition, symbol "= =" corresponds to grammatical rule symbol "→", and represents in the embodiment that the structure of the form shown on the right side belongs to the class identified by the class identifier on the left side. In the following description, a class identifier is expressed by a capital letter with "#" on the left, a variable symbol is expressed by a capital letter with "_" on the left, and a functor is expressed by a small letter string and numerial characters. As an example, a structure represented by the follwing five class definitions will be described.

$\#A = = f(\#B, \#C)$      (a)

$\#B = = i$      (b)

$\#B = = j$      (c)

$\#C = = u$      (d)

$\#C = = v$      (e)

The above-mentioned definition (a) represents that class A is constituted by functor f and class identifiers #B, #C, and (b) and (c) represent that class B is functor i or j, and (d) and (e) represent that class C is functor u or v.

In other words, each class is a set of terms as shown below.

A = {f(i,u),f(i,v),f(j,u),f(j,v)}
B = {i,j}
C = {u,v}

When the input data is f(i, u), its structure is analyzed as follows:

(1) Pattern matching is performed between f(i, u) and #A, and i and u are bound to #B and #C respectively.

(2) Pattern matching is performed between i and #B, and the above-mentioned (b) which matches is selected.

(3) Pattern matching is performed between u and #C, and the above-mentioned (d) which matches is selected.

In this example, the class identifier #A becomes the start point of processing. Such a class identifier is hereinafter called a start symbol.

As above described, in the embodiment, the structure to be outputted is described in association with classes. More specifically, the structure to be outputted is expressed by a term including variables, and the class identifier is provided with a term including variables in the rear, thereby indicating the association of the class with the structure to be outputted. Information obtained in the transformation process is stored by replacing variable symbols in the term including variables with terms.

For the above-mentioned example of class definitions, the structure to be outputted is enclosed in [ ] and placed at the rear of each class identifier, thereby forming the following transformation rules.

---
A[add(_X,_Y)]
= = f(#B[_X], #C[_Y])      ... (a')
B [zero]
= = i      ... (b')
B [one]
= = j      ... (c')
C[two]
= = u      ... (d')
C[three]
= = v      ... (e')
---

The data transformation is performed in the following procedure.

(1) Pattern matching is performed between input data f(i,u) and #A, and (a') is selected, and i and u are bound to #B and #C respectively.

(2) Pattern matching is performed between i and #B, and matching (b') is combined with #B on the right side of (a').

(3) Variable _X of (a') is replaced by term "zero" obtained from the argument on the left side of the combined (b').

(4) Pattern matching is performed between u and #C, and matching (d') is combined with #C on the right side of (a').

(5) Variable _Y of (a') is replaced by term "two" obtained from the argument on the left side of the combined (d').

(6) Term "add(zero, two)" thus obtained from the argument on the left side of (a') makes output data.

In the above-mentioned process, binding of the input data to the class identifiers and binding of the variables to the data to be outputted are recorded in nodes of a tree structure as the intermediate structure.

Figure 8:
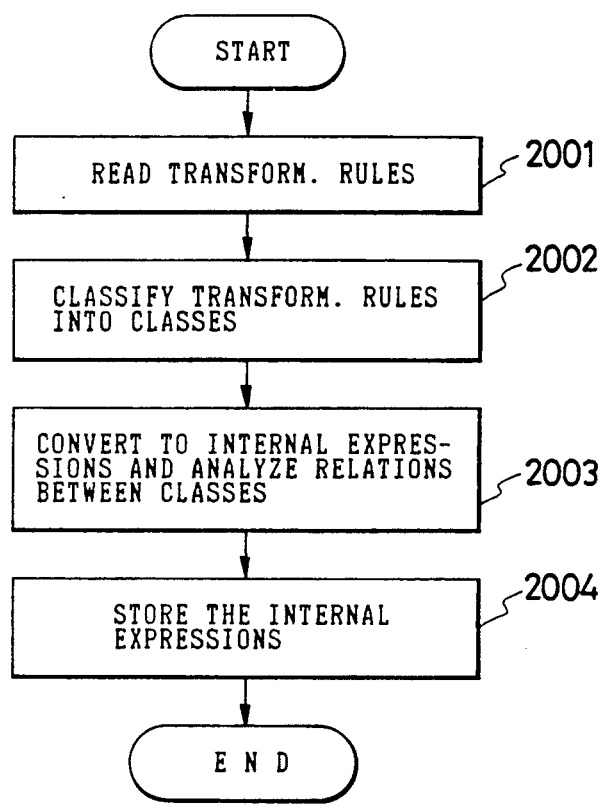
FIG. 8 is a flowchart illustrating process of analyzing transformation rules in the system of FIG. 7.

FIG. 8 shows processing of converting transformation rules into internal expressions in a flowchart. The transformation rule analyzing section 54 reads transformation rules and a start symbol (step 2001), and classifies these transformation rules into classes and marks the class corresponding to the start symbol (step 2002). Next, the transformation rule analyzing section 54 converts each transformation rule into an internal expression and analyzes relations between classes, and chains the transformation rules of the same class with each other and also chains these with the transformation rules having the class identifier indicating this class on the right side (step 2003), and stores the internal expressions of the transformation rules thus obtained in the transformation rule storage section 57 (step 2004).

Figure 9A:
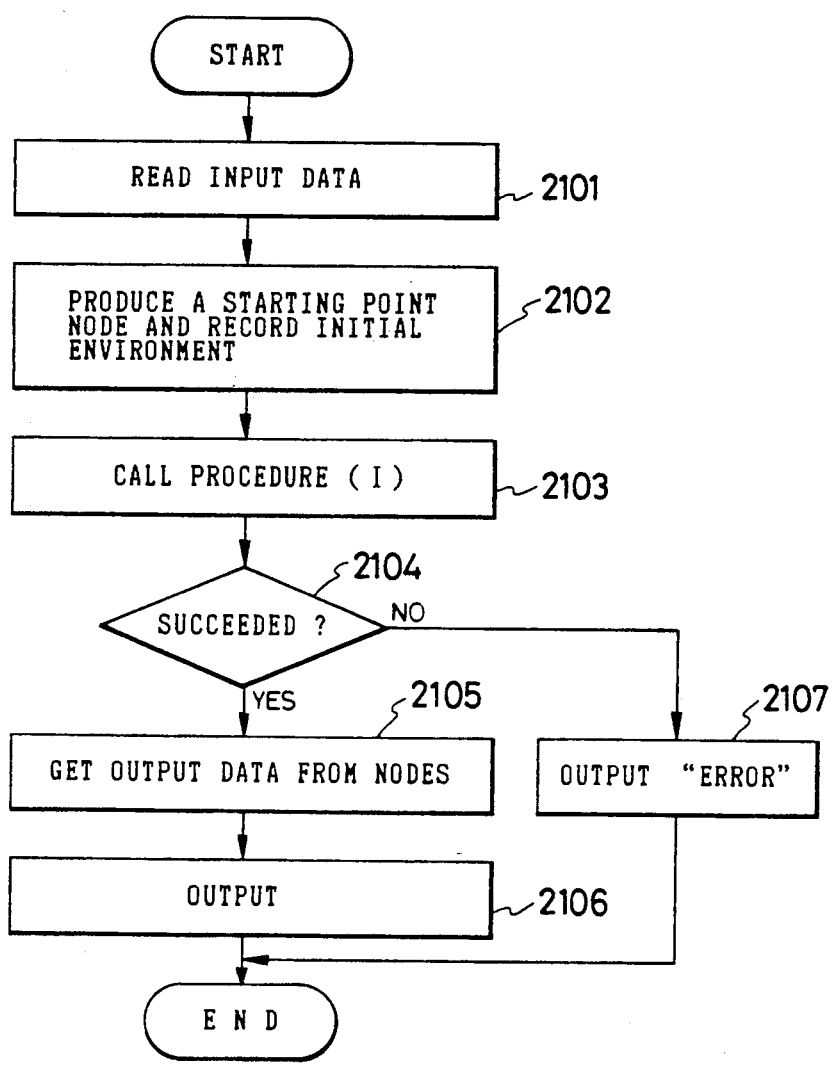
FIGS. 9A through 9C are flowcharts illustrating an outline of process of data transformation in the system of FIG. 7.
Figure 9B:
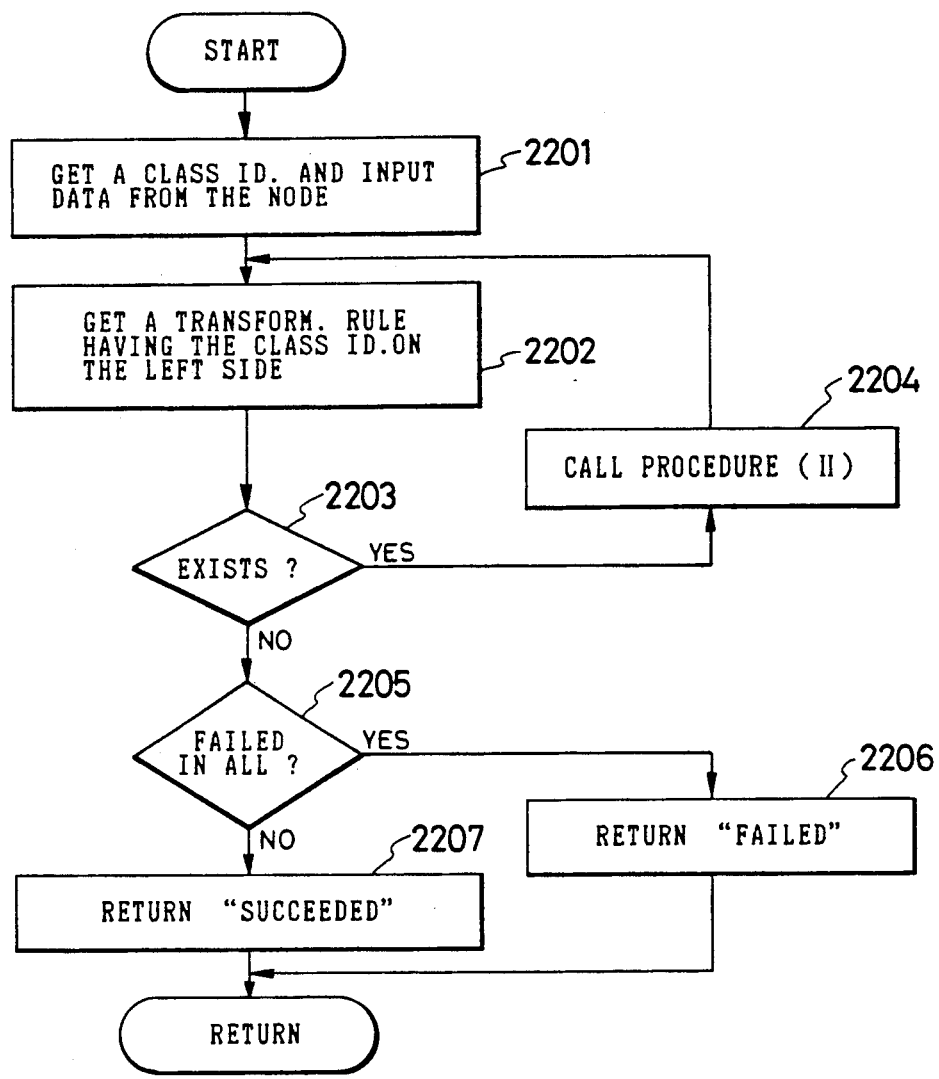
Figure 9C:
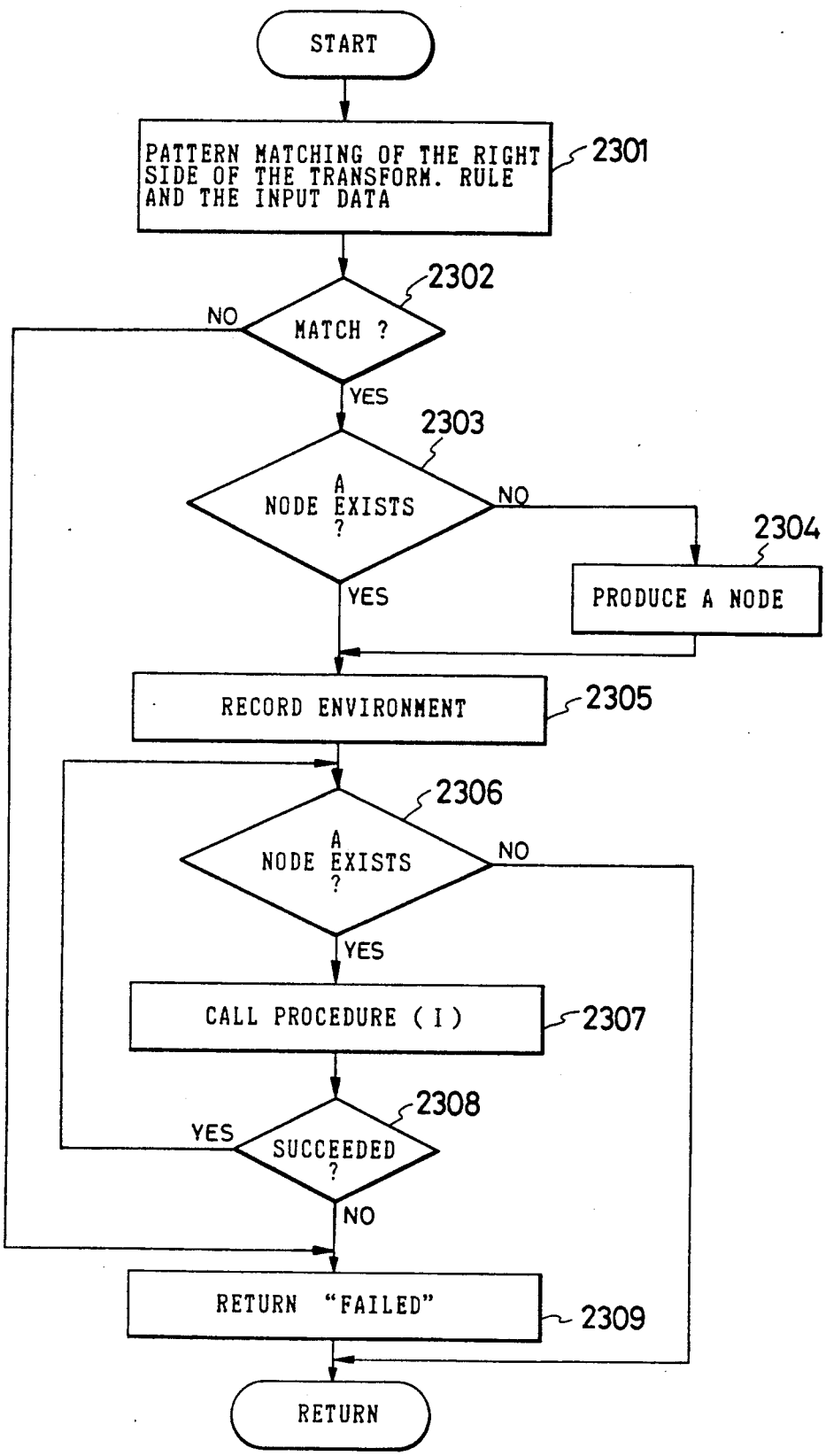

FIGS. 9A through 9C show an outline of the data transformation processing. Among these, FIG. 9A shows the main flow of the data transformation, and particularly relates to input/output operation of data and start of the pattern matching control section 55. When the input data is given, the data transformation processing system reads the data (step 2101), and produces a starting point node in the intermediate structure storage section 58 and records the initial environment therein, and obtains the start symbol from the transformation rule storage section 57 (step 2102), and subsequently calls procedure (I), giving that node as argument (step 2103). If procedure (I) is performed with succeess (step 2104), the processing system gets the output data recorded on the node produced in the step 2102 (step 2105), and outputs it (step 2106). If procedure (I) fails, "syntactic error in the input data" is outputted (step 2107).

FIG. 9B shows processing flow of procedure (I) shown in the step 2103 in FIG. 9A, and this processing is performed by the pattern matching control section 55. Argument of procedure (I) is a node of the intermediate structure. The pattern matching control section 55 gets a class identifer (class ID.) and input data from the given node (step 2201), and then gets a transformation rule having this class identifier on the left side from the transformation rule storage section 57 (step 2202). If such a transformation rule is obtained (step 2203), the pattern matching control section 55 calls procedure (II) giving the transformation rule and the input data obtained in the step 2201 as arguments (step 2204), and process is returned to the step 2202. After the processing is finished for all of such transformation rules, if procedure (II) fails in processing every rule (step 2205), "failed" is returned (step 2206). If not so, "succeeded" is returned (step 2207).

FIG. 9C shows processing flow of procedure (II) shown in the step 2204, and this processing is performed by the pattern matching section 56. Arguments of procedure (II) are a transformation rule and input data. The pattern matching section 56 performs pattern matching of the transformation rule and the input data of arguments (step 2301). If a match is not found (step 2302), "failed" is returned (step 2309).

If a match is found, the pattern matching section 56 examines the intermediate structure storage section 58 and searches for a node having a pair of the class identifier on the right side of the matching transformation rule and the input data (step 2303), and if it does not exist, such a node is produced (step 2304), and the present environment is recorded in this node (step 2305). In sequence for all of the class identifiers contained on the right side of the transformation rule (step 2306), procedure (I) is called, taking the node as argument (step 2307), and if procedure (I) succeeds (step 2308), processing of the next class identifier is performed (step 2306). If the procedure fails even one time in the middle, "failed" is returned (step 2309).

The invention can be realized either by hardware or by software. An embodiment by software will be hereinafter described.

FIG. 10 shows an example of the internal expression of the transformation rule stored in the transformation rule storage section 57. In the internal expression 61 of the transformation rule, counting from the left, the first element is a class identifier shown on the left side of the transformation rule, the second element is the right side thereof, i.e., an input pattern, the third element is an output pattern shwon by the argument of the class identifier on the left side, the fourth element is a pointer to an auxiliary element 62 as hereinafter described, and the fifth element is a set of pointers to associated nodes (including leaves).

The auxiliary element 62 is produced for each class identifier or variable contained int he input pattern on the right side of the transformation rule. The first element of the auxiliary element 62 is a class identifier or variable as above described, the second element is an output pattern shown as the argument of the class identifier or variable of the first element, and the third element is a pointer to the next suxiliary element (if any).

FIG. 11 shows an example of various information units to constitute the intermediate structure information, and these are stored in the intermediate structure storage section 58. A node other than a leaf comprises a main node 71 and a subnode 73. In the main node 71, the first element is a pointer to input data given as argument, the second element is a pointer to a parent subnode, the third element is a class identifier on the left side of the transformation rule given as argument, i.e., the first element of its internal expression 61, the fourth element is an output pattern of that transformation rule, i.e., the third element of tis internal expression 61, the fifth element is a flag which is initially reset to "false" and set to "true" on success of pattern matching, and the sixth element is a pointer to a subnode. A leaf 72 is a special main node without subnode, and is therefore the same as the main node 71 except that the sixth element is nil.

In the subnode 73, the first element is a pointer to input data bound as a result of pattern matching, the second element is a pointer to the main node, the third element is a class identifier or variable which is the first element of the corresponding auxiliary element 62, the fourth element is an output pattern which is the second element of that auxiliary element, the fifth element is a pointer to a node connector 74 as hereinafter described, and the sixth element is a pointer to the next subnode (if any).

The node connector 74 is information which links a node to one or more child nodes in a list form. The first element of the node connector 74 is a pointer to the child main node (including a leaf), and the second element thereof is a pointer to the next node connector (if any).

Figure 12B:
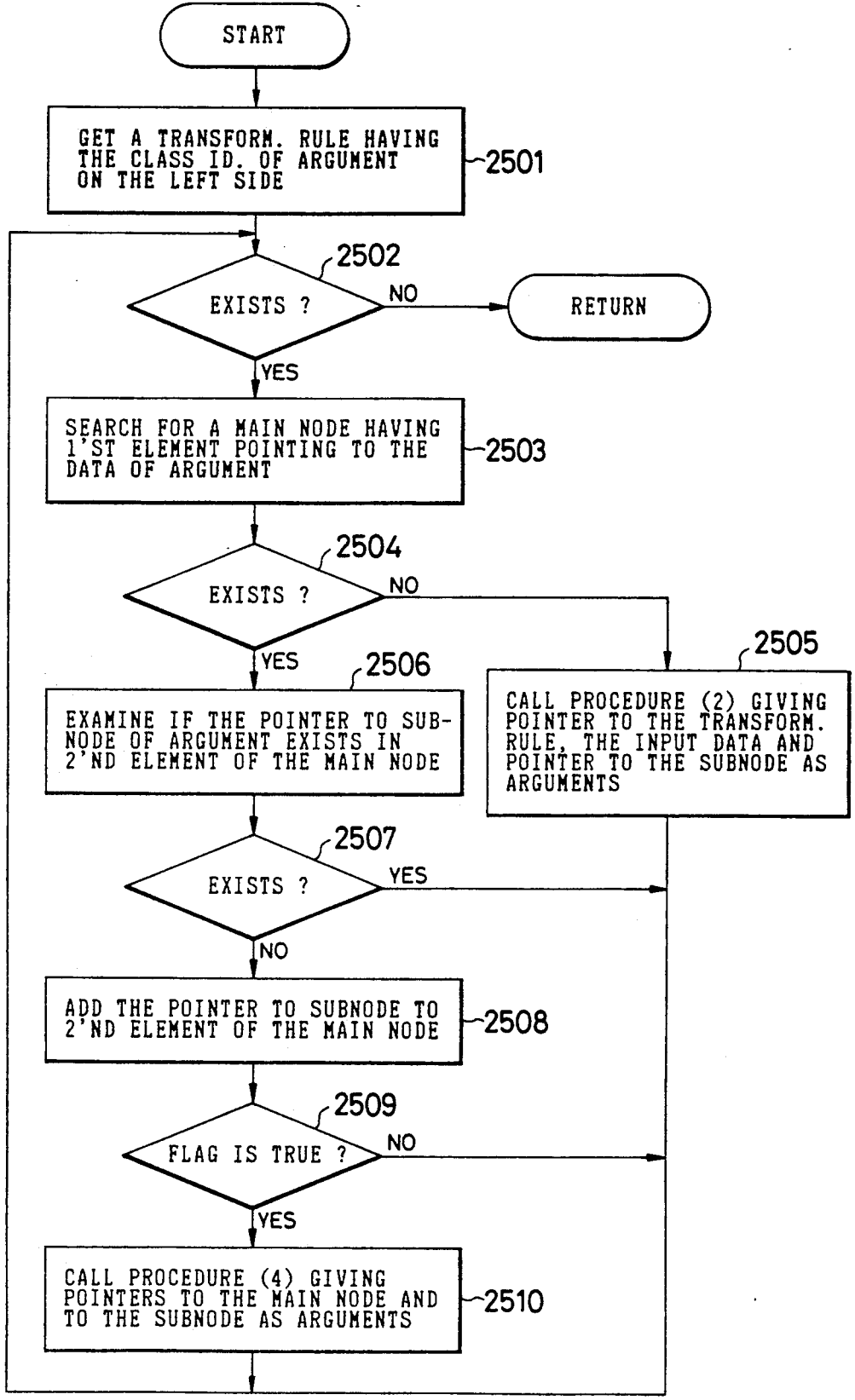

FIGS. 12A through 12E show in detail data transformation processing the outlint of which is shown in FIGS. 9A through 9C. FIG. 12A is a flowchart of the main routine, and this routine performs input/output operation of data and start of the pattern matching control section 55 as follows. This routine reads input data (step 2401), and produces a special main node and subnode as a starting point (step 2402), and initializes the environment (step 2403). Thus in the starting main node, the first element is set to a pointer to the inptu data, the second element is set to nil. the third element is set to a special symbol indicating the starting point, the fourth element is set to a dummy variable symbol, the fifth element is set to "false", and the sixth element is set to a pointer to the subnode. Further in the subnode, the first element is set to a pointer to the input data, the second element is set to a pointer to the main node, the third element is set to the start symbol, the fourth element is set to the same dummy variable as the fourth element of the main node, and the fifth element is set to nil. Subsequently this routine calls procedure (1), giving the start symbol, the input data, and the pointer to that subnode as arguments (step 2404). And then this routine evaluates the output data under the environment set to nodes by procedure (1) (step 2405), and outputs it (step 2406).

FIG. 12B is a flowchart of procedure (1). Procedure (1) performs pattern matching, taking a class identifier, the input data and a pointer to a subnode as arguments. Procedure (1) first gets a transformation rule having the class identifier of argument from the transformation rule storage section 57 (step 2501). If such a transformation rule does not exist (step 2502), a return to the calling procedure takes place. If a required transformation rule exists, procedure (1) follows the fifth element of the transformation rule to search for a main node having the first element pointing to the data of argument (step 2503). If it does not exist (step 2504), procedure (2) is called, taking the pointer to the transformation rule obtained in the step 2501 and the input data and pointer to a subnode given as arguments as arguments (step 2505), and process is returned to the step 2501.

On the other hand, if a required main node is found in the step 2503, procedure (1) examines if the second element of this main node, i.e., a set of pointers to the parent subnodes, includes the pointer to a subnode of argument (steps 2506, 2507). If the former includes the latter, process is returned to the step 2501. If not so, the latter is added to the former (step 2508). Then, if the flag in the main node obtained in the step 2503 is "false" (step 2509), process returns to the step 2501. If the flag is "true", procedure (4) is called, taking a pointer to this main node and the pointer to a subnode of argument as argument (step 2510), and process returns to the step 2501.

FIG. 12C is a flowchart of procedure (2). Procedure (2) receives a pointer to a transformation rule, the input data, and a pointer to a subnode as arguments, and performs producing of a main node or a leaf, pattern matching of the input data and the input pattern (second element) in that transformation rule, and producing of subnodes if necessary. Procedure (2) first produces a main node, and adds a pointer to this main node to the fifth element (a set of pointers to nodes) of the transformation rule pointed to by argument (step 3601). In this main node (which becomes afterwards either a normal main node or a leaf), the first element is set to a pointer to the input data of argument, the second element is set to the pointer to a subnode of argument, the third element and the fourth element are set respectively to a copy of the first element and the third element of that transformation rule, the fifth element is set to "false", and the sixth element is set to nil. And then pattern matching of the second element of the above transformation rule and the input data of argument is performed (step 2603). If it fails (step 2603), return is performed.

When the pattern matching succeeds, procedure (2) examines auxiliary elements via the fourth element of the transformation rule. If the input pattern on the right side of the transformation rule does not include a class identifier (step 2604), procedure (3) is called, taking a pointer to the main node produced in the step 2601 as argument (step 2605). In this case, since a subnode is not produced, this main node becomes a leaf. On the other hand, if the input pattern includes a class identifier, procedure (2) produces subnodes for respective class identifiers, and chains these subnodes using the sixth element thereof from the sixth element of the main node produced in the step 2601 (step 2606). In this case, the main node becomes a normal main node. In each of the subnodes, the first element is set to a pointer to input data bound to the first element (class identifier) of the corresponding auxiliary element as a result of pattern matching, the second element is set to a pointer to the main node, the third element and the fourth element are set respectively to a copy of the first element and the second element of the corresponding auxiliary element, and the fifth element is set to nil. And then procedure (1) is called, taking a pointer to each subnode thus produced, and its first and third elements as arguments (step 2607).

Figure 12D:
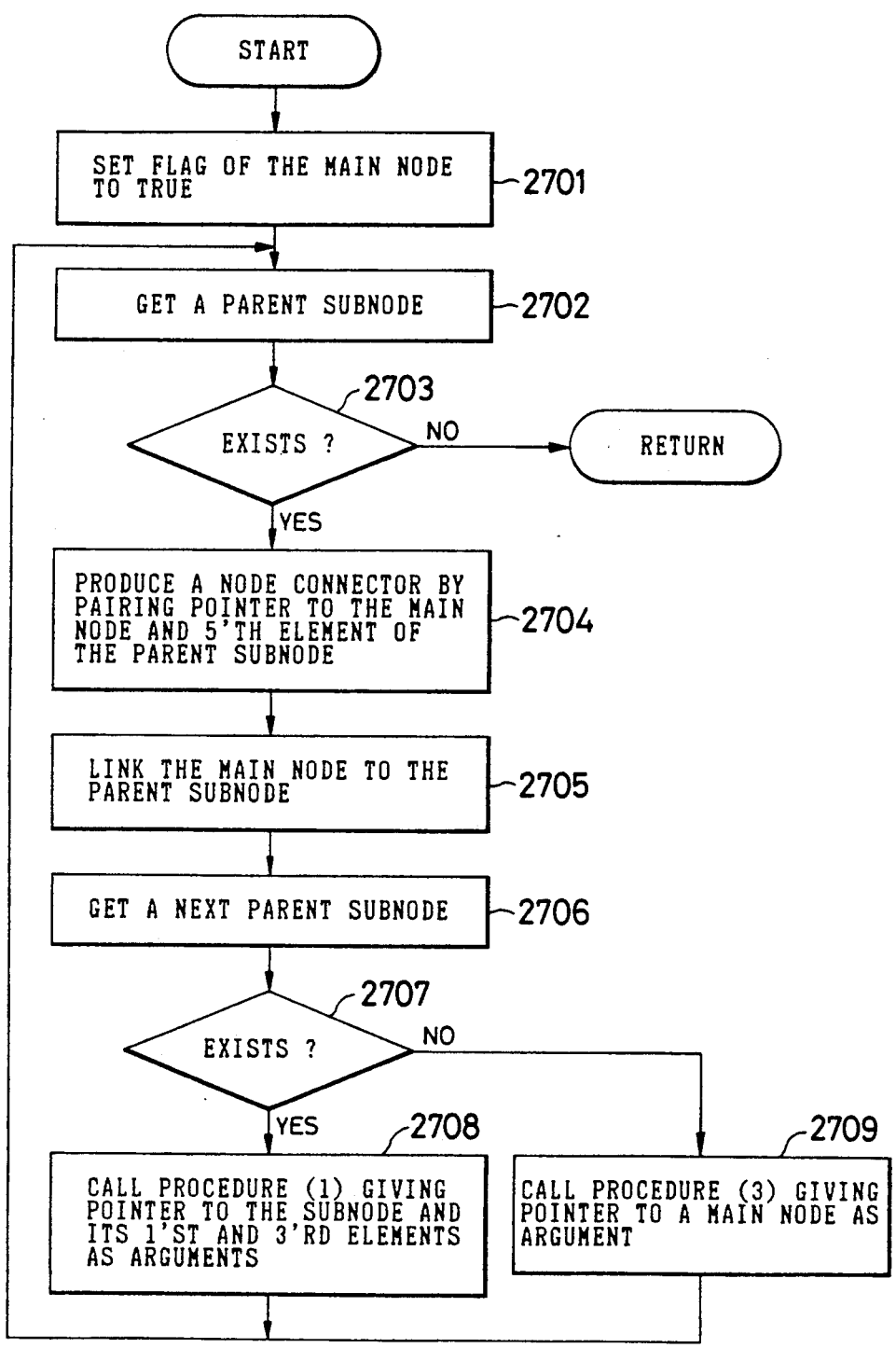

FIG. 12D is a flowchart of procedure (3). procedure (3) produces a node connector and interlinks nodes, taking a pointer to a main node or leaf with which the pattern matching succeeded as argument. Procedure (3) first sets the flag of the main node pointed to by argument to "true" (step 2701), and gets a parent subnode via the second element of this main node (step 2702). If a parent subnode does not exist (step 2703), a return takes place. If a parent subnode exists, procedure (3) produces a node connector using the pointer to the main node and the fifth element of this parent subnode in a pair (step 2704), and replaces the fifth element of the parent subnode with a pointer to the node connector thus produced, thereby linking these nodes (step 2705). Further, the next parent subnode is sought via the sixth element of the parent subnode (step 2706). If the next parent subnode exists (step 2707), procedure (1) is called, taking a pointer to the obtained subnode and its first and second elements as arguments (step 2708), and return to the step 2702 is performed. If the next subnode does not exist, procedure (3) is called, taking the pointer to the main node in the parent subnode obtained in the step 2702 as argument (step 2709), and return to the step 2702 is performed.

Figure 12E:
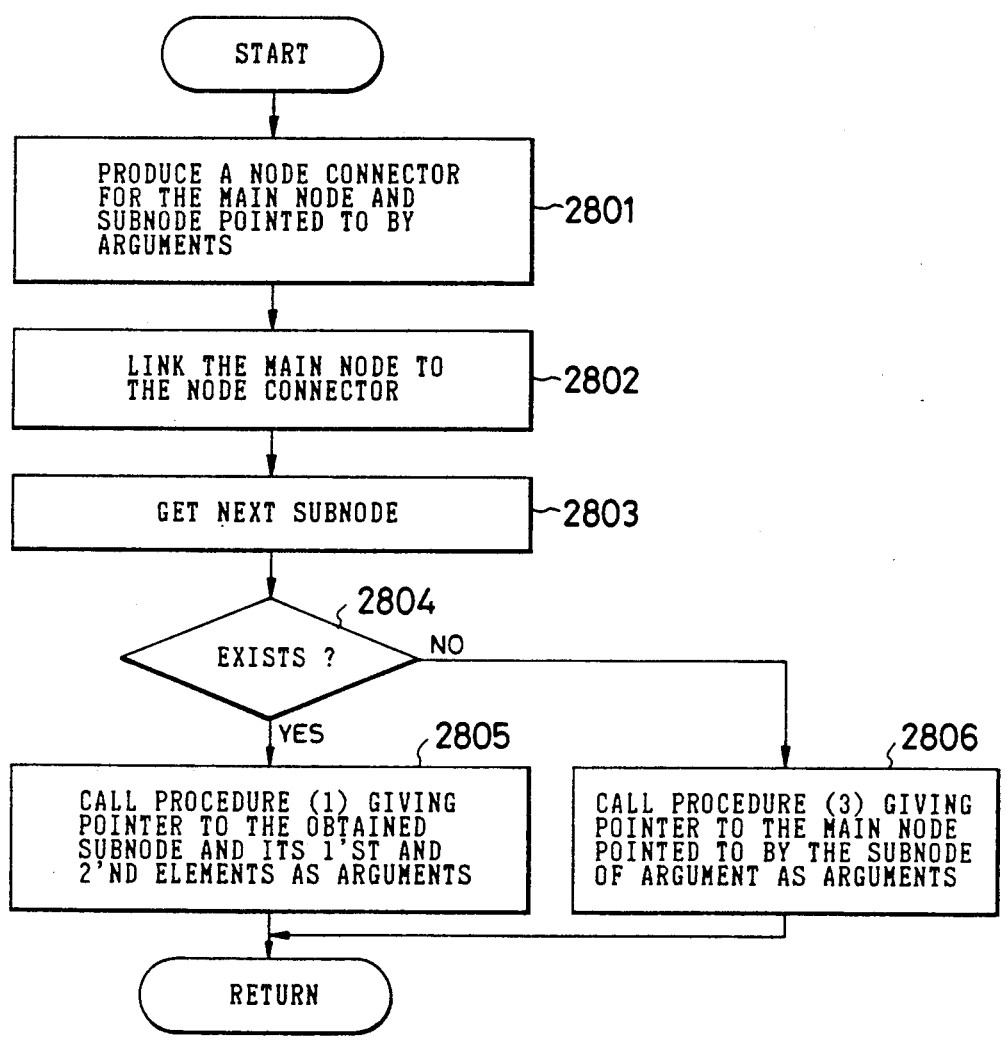

FIG. 12E is a flowchart of procedure (4) to which reference is made in FIG. 12A. Procedure (4) performs producing of a node connector and communization of nodes, taking pointers to a main node and to a parent subnode thereof as arguments. Procedure (4) first produces a node connector for the main node and the subnode pointed to by arguments (step 2801), and links the subnode to the node connector (step 2802). These steps are the same as the step 2704 and the step 2705 respectively already described regarding FIG. 12D. Procedure (4) subsequently gets the next subnode via the sixth element of the subnode (step 2803). If the next subnode exists (step 2804), procedure (1) is called, taking a pointer to the obtained subnode and its first and third elements as arguments (step 2805). If the next subnode does not exist, procedure (3) is called, taking a pointer to a main node obtained from the subnode pointed to by argument as arguments (step 2806).

Figure 13:
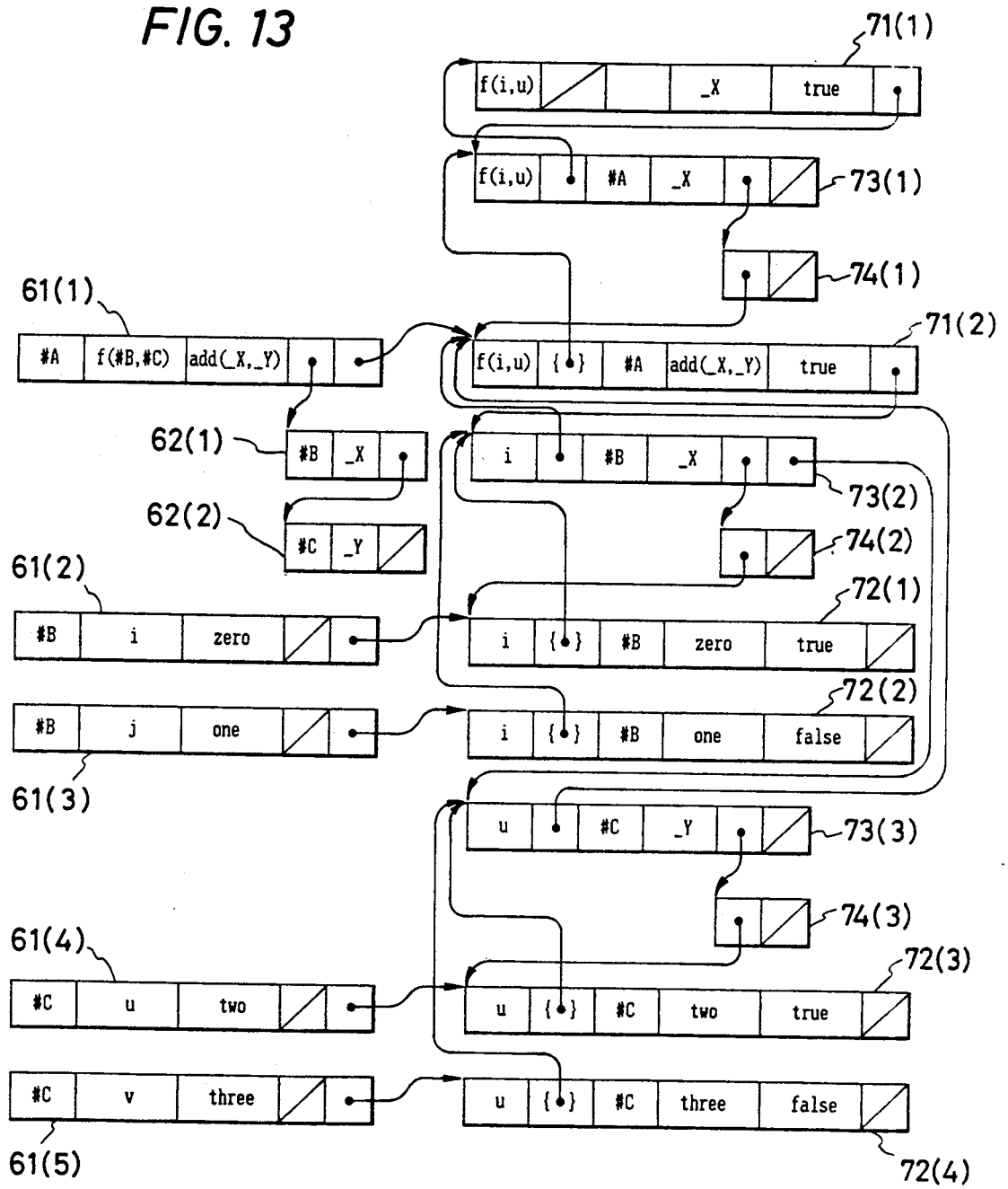
FIG. 13 is a diagram illustrating a specific example of information shown in FIG. 10 and FIG. 11.

FIG. 13 shows internal expressions of the transformation rules and the intermediate structure regarding the above-mentioned transformation rules (a') through (e'). In order to help understanding of the embodiment, the process that internal expressions shown in FIG. 13 are produced will be described.

In FIG. 13, 61(1) through 61(5), 62(1) and 62(2) are obtained by the transformation rule analyzing section 54 in accordance with processing shown in FIG. 8 from the transformation rules (a') through (e'). Although not shown, chains regarding #B are extended between 61(2) and 61(3) and from 61(1) to these, and chains regarding #C are extended between 61(4) and 61(5) and from 61(1) to these.

71(1) designates a main node indicating the starting point of the data transformation processing. The main routine (FIG. 12A) produces the main node 71(1) together with a subnode 73(1) in the step 2402, and calls procedure (1), giving #A (start symbol), f (i, u) and 73(1) as arguments (step 2404). Procedure (1) searches for the transformation rule 61(1) having #A on the left side in the step 2501, and calls procedure (2), giving 61(1), f(i, u) and 73(1) as arguments (step 2504). Procedure (2) produces the main node 71(2) (step 2601), and performs pattern matching of f(#B, #C) and f(i, u) (step 2602). In this pattern matching, #B matches with i and #C matches with u, and accordingly 73(2) and 73(3) corresponding to 62(1) and 62(2), respectively, are produced (step 2606), and the sixth element of 73(2) is set so as to point 73(3), and procedure (1) is called, taking #B, i and 73(2) as arguments (step 2607).

Procedure (1) searches for transformation rules 61(2), 61(3) having #B as the first element (step 2501), and calls procedure (2) for each of a set of 61(2), i and 73(2) and a set of 61(3), i and 73(2) (step 2505). Procedure (2) called with 61(3), i and 73(2) given as arguments produces the main node (leaf) 72(2) (step 2601), and tries pattern matching of i and j (step 2602), but fails, and therefore returns to procedure (1).

On the other hand, procedure (2) called with 61(2), i and 73(2) given as arguments produces the main node (leaf) 72(1) (step 2601), and tries pattern matching of i and i (step 2602), and succeeds, and therefore calls procedure (3), giving 72(1) as argument (step 2605). Procedure (3) sets the flag of 72(1) to "true" (step 2701), and gets 73(3) via the second element of 72(1) (step 2702), and produces the node connector 74(2) by pairing a pointer to 72(1) and the fifth element (initial value is nil) of 73(2) and links it to the fifth element of 73(2) (steps 2704, 2705), and gets 73(3) via the sixth element of 73(2) (step 2706), and further calls procedure (1) giving #C, u and 73(3) as arguments (step 2708).

Procedure (1) called this time performs processing similar to that done for the set of #B, i and 73(2), and produces the main nodes (leaves) 72(4) and 72(3). Pattern matching succeeds only with 72(3), and the node connector 74(3) is produced and linked to 73(3) (steps 2704, 2705). Since the sixth element of 73(3) is nil (step 2707), procedure (3) is called, taking 71(2) pointed to by the second element of 73(3) as argument (step 2709). Procedure (3) sets the flag of 71(2) to "true" (step 2701), and gets 73(1) (step 2702), and produces the node connector 74(1) and links it to 73(1) (steps 2704, 2705). Since the sixth element of 73(1) is nil, procedure (3) is called, taking 71(1) as argument (step 2709). Procedure (3) sets the flag of 71(1) to "true" and gets a parent subnode via the second element of 71(1) (step 2701). However, since it does not exist (step 2703), process returns to procedure (3) on the calling side. Since the parent subnode of 71(2) has been processed, this procedure (3) on the calling side returns to procedure (3) further on the calling side. Thus the procedures are released in sequence, and the control is transferred to the step 2405 of the main routine.

The step 2405 binds the output pattern $\_X$ of the starting main node 71(1) via the subnode 73(1) and the node connector 74(1) to the output pattern "add($\_X$,$\_Y$)" of the child main node 71(2). In general, there are a plurality of child main nodes linked to a subnode through node connectors, and the output pattern of the parent main node is bound to each of the output patterns of these child main nodes. In a manner similar to that the output pattern of 71(1) is bound to the output pattern of 71(2), the variable symbol $\_X$ of the output pattern of 71(2) is bound via the subnode 73(2) to the output pattern "zero" of the child main node 72(1), and the variable symbol $\_Y$ thereof is bound via the subnode 73(3) to the output pattern "two" of the child main node 72(3).

As a result of the binding, all variable symbols are replaced and term "add(zero, two)" is formed. The processing system outputs this term (step 2406), and the transformation processing is finished.

In this embodiment, since node connectors are collected into a set, a plurality of intermediate structures are expressed in superposition, whereby the size of a memory area occupied by the intermediate structures is reduced. However, if there is no need for expressing a plurality of intermediate structures in superposition, the node connectors may be omitted. Although the internal expressions shown in FIG. 10 and FIG. 11 assume the list format, any other type of expression logically equivalent thereto, such as a table or tables, may be used. Also, the pointer to the input data may be replaced by other information which identifies the input data and includes information sufficient for pattern matching. This applies to other information.

Processings shown in FIG. 8 and FIGS. 12A through 12E may be performed either in sequence or in parallel.

The invention can be utilized in implementation of abstract data type. This will be shown by way of example in two data types, SEQITEM and VECTOR, defined as follows.

| sort: | SEQITEM | | |
|---|---|---|---|
| operations: | nlsq | | → SEQITEM |
| | apdl | ITEM,SEQITEM | → SEQITEM |
| | car | SEQITEM | → ITEM |
| | cdr | SEQITEM | → SEQITEM |
| | isnil | SEQITEM | → BOOLEAN |
| laws: | car(apdl($\_i$,$\_s$)) | | = $\_i$ |
| | cdr(apdl($\_i$,$\_s$)) | | = $\_s$ |
| | isnil(nlsq) | | = true |
| | isnil(apdl($\_i$,$\_s$)) | | = false |
| sort: | VECTOR | | |
| operations: | emptyv | | → VECTOR |
| | assign VECTOR,INDEX,ITEM | | |
| | | | → VECTOR |
| | read VECTOR,INDEX | | |
| | | | → ITEM |
| laws: | read(emptyv,$\_ix$) | | = undefined |
| | read(assign($\_v$,$\_ix1$,$\_i$),$\_ix2$) | | |
| | | | = if $\_ix1$ = $\_ix2$ then $\_i$ else read($\_v$,$\_ix2$) |

Implementation of data type SEQITEM by VECTOR is expressed as follows:

```
d     (nlsq) = emptyv
  SEQITEM
d     (apdl(_i,_s))
  ITEM SEQITEM SEQITEM
  = <assign(vector(_s),size(_s)+1,_i),
     size(_s)+1>
d     (car(_s))
  SEQITEM ITEM
  = read(vector(_s),size(_s))
d     (cdr(_s))
  SEQITEM SEQITEM
  = <vector(_s),size(_s)−1>
```

In the embodiment, this is given as following transformation rules.

```
#SEQITEM[_s]
  == #SZDVCT[_s]
#SZDVCT[<_v,_ix>]
  == <#VECTOR[_v],#INDEX[_ix]>
#SZDVCT[<emptyv,zero>]
  == nlsq
#SZDVCT [<assign(_v,_ix+1,_i),_ix+1>]
  == apdl(#ITEML[_i],#SEQITEM[<_v,_ix>])
#ITEM[read(_v,_ix)]
  == car(#SEQITEM[<_v,_ix>]
#SZDVCT[<_v,_ix-1>]
  == cdr(#SEQITEM[<_v,_ix>]
```

As input data, if formula
  car(cdr(cdr(apdl(C,apdl(B,apdl(A,nil))))))
is given, it is transformed in accordance with the above transformation rules into formula

```
              read(
                <assign(
                  <assign(
                    <assign(
                      <emptyv,0>
                      1,A),1>,
                      2,B),2>,
                      3,C),3>
                ,1)
```

Using the invention, specification described in an algebraic form can be executed. Since abstract data type can be deemed as algebraic specification description of data type, the above-mentioned SEQITEM is taken as an example. laws are expressed by the transformation rules of the embodiment as follows:

```
#SEQITEM[nlsq]
  == nlsq
#SEQITEM[apdl(_i,_s)]
  == apdl(#ITEM[_i],#SEQITEM[_s])
#ITEM[_i]
  == car(apdl(#ITEM[_i],#SEQITEM[_s]))
#EXP[_s]
  == cdr(apdl(#ITEM[_i],#SEQITEM[_s]))
#BOOLEAN[true]
  == isnil(nlsq)
#BOOLEAN[false]
  == isnil(apdl(_i,_s))
#EXP[apdl(_e)]
  == apdl(#EXP[_e])
#ITEM[car(_e])
  == car(#EXP[_e])
#EXP[cdr(_e)]
  == cdr(#EXP[_e])
```

These transformation rules are applied repeatedly, whereby formula
  car(cdr(cdr(apdl(C,apdl(B,apdl(A,nil))))))
is transformed after the first application into
  car(cdr(apdl(B,apdl(A,nil))))
after the second application into
  car(apdl(A,nil))
and after the third application into
  A In the embodiment, the above-mentioned repeated application can be realized by repeatedly executing the steps 2402 through 2405 of the main routine.

The transformation rules of the embodiment can be expressed in different notations. An example is as follows:

```
<transformation rule> is expressed as:
  sequence of <class definition> and <operation rule>
<class definition> is expressed as:
  class identifier →
  term including class identifiers
<operation rule> is expressed as:
  == term including variables {sequence of <biding formula>}
<binding formula> is expressed as:
  term including variables == class identifier
```

The above example of the transformation rules described in this notation will be as follows:

```
#SEQITEM → #SZDVCT
  == _x
     {_x==#SZDVCT}
#SZDVCT → <#VECTOR,#INDEX>
  == <_v,_ix>
     {_v==#VECTOR, _ix==#INDEX}
#SZDVCT → nlsq
  == <empty,zero>
#SZDVCT → apdl(#ITEM,#SEQITEM)
  == <assign(_v,_ix+1,_i),_ix+1>
     {_i==#ITEM <_v,_ix>==#SEQITEM}
#ITEM → car(#SEQITEM)
  == read(_v,_ix)
     {<_v,_ix>==#SEQITEM}
#SZDVCT → cdr(#SEQITEM)
  == <_v,_ix-1>
     {<_v,_ix>==#SEQITEM}
```

Also for the transformation rules described in such manner, the transformation can be effected by the above embodiment if only the steps 2001 and 2002 are so modified as to suit to the notation of the transformation rules, without changing other processings.

What is claimed is:

1. A method performed in a data processing system for transforming a symbol string to a term in accordance with transformation rules, input to said data processing system, comprising the steps of:

storing one or more transformation rules which describe syntactic structures of input symbol strings using context-free grammar notation, said transformation rules including descriptions of structure of output in a manner of description of a using context-free grammar notation, said transformation rules including descriptions of structures of output terms, said descriptions of structures of output terms being linked in a predetermined notational form with terminal symbols and non-terminal symbols used in said context-free grammar notation;

inputting a symbol string;

analyzing the syntactic structure of said inputted symbol string by reduction processing in which a non-terminal symbol is sought which can be rewritten, by applying said transformation rules, into said inputted symbol string, thereby determining terminal symbols and non-symbol symbols that represent syntactic structures of said inputted symbol string; and producing a term to be outputted based on said descriptions of structures of output terms linked with said terminal symbols and non-terminal symbols that represent syntactic structure of said inputted symbol string;

said term being a group of symbols having a tree structure corresponding to said analyzed syntactic structure of said inputted symbol string.

2. The method as claimed in claim 1, wherein said reduction processing is performed in accordance with Earley's parsing algorithms.

3. The method as claimed in claim 1, wherein said analyzing step includes steps of:
   performing pattern matching of said inputted symbol string and said transformation rules;
   forming an intermediate tree having said non-terminal symbols as nodes and said terminal symbols as leaves; and
   recording results of said pattern matching in said nodes and said leaves.

4. The method as claimed in claim 3, wherein said descriptions of structures of output terms include variables, and said producing step includes a step of substituting said results of pattern matching recorded in the nodes and the leaves for the variables in the descriptions of structures of output terms linked with said non-terminal symbols in the nodes and said terminal symbols in the leaves, thereby forming said term to be outputted.

5. The method as claimed in claim 4, wherein said step of forming an intermediate tree includes a step of producing a node connector which interlinks a plurality of nodes corresponding to the same transformation rule to form a set of nodes.

6. The method as claimed in claim 5, wherein said step of forming an intermediate tree includes a step of producing a node-set constructor which interlinks said sets of nodes of a plurality of intermediate trees to superpose said intermediate trees.

7. The method as claimed in claim 3, wherein said storing step includes a step of producing from each of said transformation rules transformation rule elements each including the non-terminal symbol on the left side thereof and a different factor on the right side thereof, said pattern matching is performed with respect to each of said transformation rule elements, and said step of forming an intermediate tree produces said nodes and said leaves corresponding to said transformation rule elements.

8. The method as claimed in claim 1, wherein said descriptions of structures of output terms are provided as arguments of said non-terminal symbols and said terminal symbols.

9. A method performed in a data processing system for transforming structured data to differently-structured data in accordance with transformation rules input to said system, comprising the steps of:
   storing one or more transformation rules which classify structures and partial structures of input data into classes by assigning class identifiers respectively to the structures and partial structures, and describe the structures of input data using class identifiers assigned to the partial structures, and include descriptions of structures of output data, said descriptions of structures of output data being linked in a predetermined notational form with said class identifiers;
   inputting structured data;
   analyzing the structure of said inputted structured data to classify the structure and partial structures of said inputted structured data into classes based on said transformation rules, by seeking class identifiers assigned to the structure and partial structures of said inputted structured data; and
   producing structured data to be outputted based on the descriptions of the structures of output data linked with class identifiers assigned to the structure and partial structures of said inputted structured data;
   said inputted structured data and said output structured data having tree structures corresponding to syntactic structures of symbol strings.

10. The method as claimed in claim 9, wherein said analyzing step includes steps of:
    performing pattern matching of said inputted structured data and said transformation rules;
    classifying the structure and partial structures of said in putted structured data into said classes by establishing correspondence of the structure and partial structures of said inputted structured data to the class identifiers;
    forming a tree-structured intermediate structure having as nodes the class identifiers that correspond to the structure and partial structures of said inputted structured data; and
    recording results of said pattern matching in said nodes.

11. The method as claimed in claim 10, wherein said descriptions of structures of output data includes variables, and said producing step includes a step of substituting said results of pattern matching recorded in said nodes for the variables in the descriptions of structures of output data linked with said class identifiers in the nodes, thereby forming said structured data to be outputted.

12. The method as claimed in claim 11, wherein said step of forming an intermediate structure includes a step of producing a node connector which interlinks nodes of a plurality of intermediate trees using one node in common to superpose said intermediate trees.

13. The method as claimed in claim 9, wherein said classes are identified in said transformation rules by respective class identifiers, and said descriptions of output data are provided in association with said class identifiers.

* * * * *